United States Patent [19]
Ikegami et al.

[11] Patent Number: 5,304,769
[45] Date of Patent: Apr. 19, 1994

[54] ELECTRODE FOR RESISTANCE WELDING

[75] Inventors: Kiyoshi Ikegami; Teruaki Yoshida; Mitsuo Kuwabara; Tamotsu Harada; Yukihiro Yaguchi, all of Sayama, Japan

[73] Assignee: Honda Giken Kogyo Kabushiki Kaisha, Tokyo, Japan

[21] Appl. No.: 905,119

[22] Filed: Jun. 26, 1992

[30] Foreign Application Priority Data

Jun. 27, 1991 [JP] Japan .................. 3-156754
Jun. 27, 1991 [JP] Japan .................. 3-183021
Sep. 30, 1991 [JP] Japan .................. 3-251108

[51] Int. Cl.⁵ ................ B23K 11/30; B23K 35/04
[52] U.S. Cl. ............................................ 219/119
[58] Field of Search ............... 219/119, 120, 93, 68

[56] References Cited

U.S. PATENT DOCUMENTS

| 1,303,919 | 5/1919 | Lachman | 219/119 |
| 2,379,187 | 6/1945 | Richards | 219/119 |
| 3,574,075 | 4/1971 | Eccles | 219/68 |
| 4,591,687 | 5/1986 | Urech | 219/93 |
| 4,972,046 | 11/1990 | Puddle et al. | 219/118 |

FOREIGN PATENT DOCUMENTS

| 0088231 | 9/1983 | European Pat. Off. . | |
| 2155205 | 5/1973 | France | 219/119 |
| 58-159986 | 9/1983 | Japan . | |
| 62-156085 | 7/1987 | Japan . | |
| 941094 | 7/1982 | U.S.S.R. | 219/119 |

Primary Examiner—Geoffrey S. Evans

[57] ABSTRACT

For resistance-welding workpieces of metal, an electrode is pressed against superposed regions of the workpieces and an electric current is supplied to the superposed regions to heat the same due to an electric resistance of the workpieces. The electrode has a body having a tip end for pressed engagement with one of the workpieces, and a matrix of tapered teeth disposed on the tip end of the body except for a center of the tip end. The teeth define recesses therebetween. One of the recesses is positioned at the center of the tip end, and the teeth are progressively higher from an outer circumferential edge of the tip end toward the center thereof.

11 Claims, 32 Drawing Sheets

FIG.16(a)
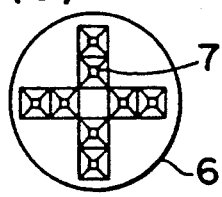
FIG. 16(b)
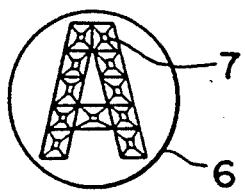
FIG.16(c)
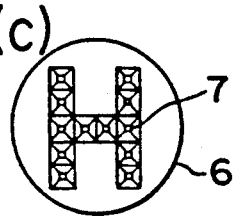
FIG.16(d)
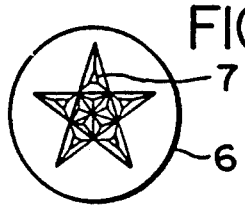
FIG.16(e)
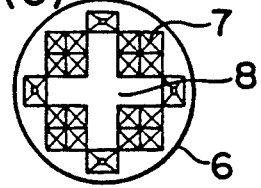
FIG.16(f)
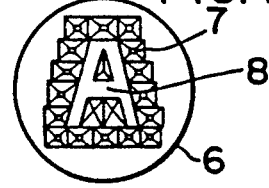
FIG.16(g)
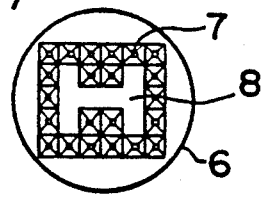
FIG.16(h)
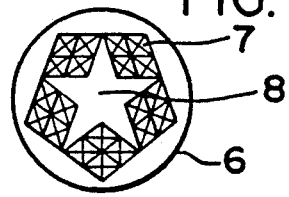
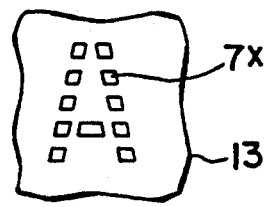
FIG. 16(i)
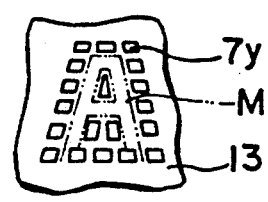
FIG. 16(j)

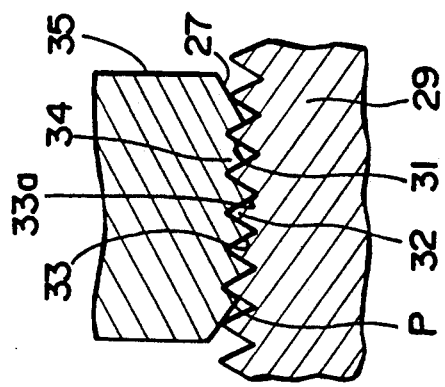
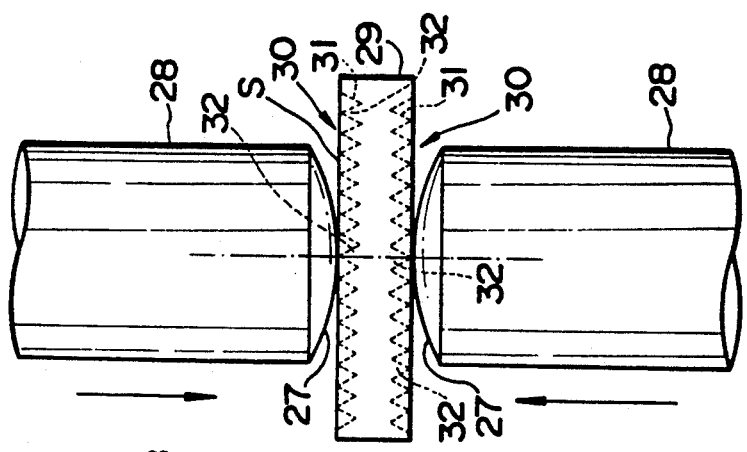
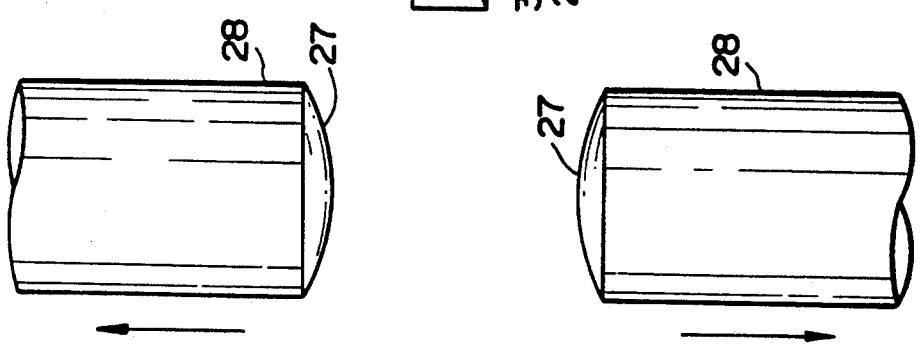
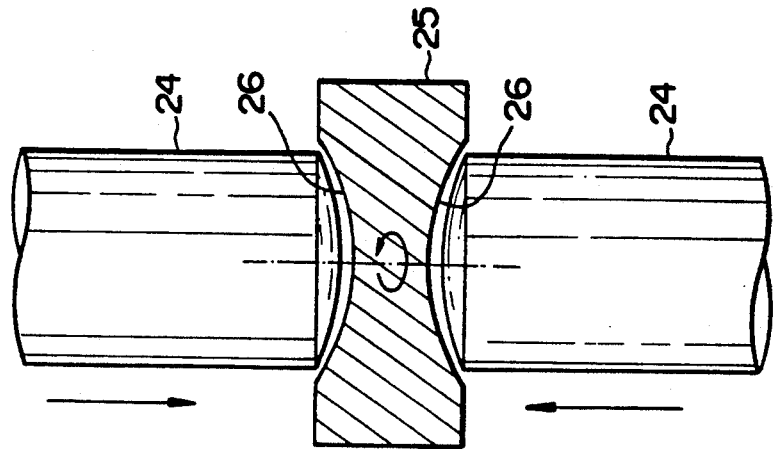

ELECTRODE FOR RESISTANCE WELDING

BACKGROUND OF THE INVENTION

1. Field of the Invention

The present invention relates to an electrode for use in resistance welding of metal plates such as of aluminum alloy, a method of manufacturing the electrode, and a method of resistance-welding workpieces using the electrode.

2. Description of Background Art

As is well known in the art, resistance welding denotes welding processes in which desired regions of metal plates (workpieces) are inserted in superposed relationship between confronting electrodes, and an electric current is supplied to the regions of the metal plates between the electrodes, so that the regions are heated by the electric resistance of the metal plates and welded together. In the case where relatively soft metal plate such as aluminum alloy plates are to be welded by utilizing resistance welding, it is customary to employ electrodes having convex hemispherical tip ends to prevent the metal plates from being deformed or cracked around the welded regions.

In the resistance welding, the electric current flowing from one of the electrodes to metal plates to be welded should preferably be distributed uniformly in a suitable range around the center of the tip end of the electrode. However, the electric current which actually flows tends to concentrate in a limited area (which may not necessarily be the center of the electrode) within the surface of the electrode which is held against the metal plate. In the limited area, fused materials are liable to be attached to the electrodes and the metal plates, or the electrodes and the metal plates tend to stick together. Therefore, if the same electrodes are used, then the number of times that the metal plates can continuously be welded by the electrodes is low, the electrodes have a short service life, and the weld beam on the metal plates does not appear sightly. Another problem is that the electrodes are apt to be worn quickly and damaged in the limited area. When the current concentrates in the limited area of the electrode which is not the center of the electrode, the nugget formed in the welded area of the metal plates is not positioned in a location corresponding to the center of the electrode, and hence no desired weld quality is obtained.

The above problems appear to arise for the following reasons:

Generally, metal plates such as aluminum alloy plates have irregular oxide films formed on their surfaces, and the oxide films serve as an electric resistance to any electric current flowing therethrough. When the electrodes are pressed against the metal plates and supply an electric current to the metal plates, the electric current flowing from one of the electrodes to the metal plates concentrates in a region where the oxide film is relatively thin between the electrode and the metal plate. Thus, the temperature of such a region excessively rises. As a result, the aluminum alloy is diffused from the metal plate into the electrode, alloying the electrode with the aluminum alloy. As the electrodes are used to weld the metal plates at more and more spots, an insulative material such as MgO, $Al_2O_3$, or the like is attached to the electrode, or the electrodes and the metal plates stick together. Since the region in which the current concentrates may not necessarily be at the center of the electrode, the nugget produced in the welded region of the metal plates may be positioned not at the center of the electrode.

A microscopic observation of the surfaces of the electrodes and the metal plates generally shows that they have an irregular distribution of minute projections or surface irregularities. When the electrodes are pressed against the metal plates, they are initially held against each other through the minute projections on the surfaces thereof. In the welding process, the welding current concentrates on the small regions where the electrodes and the metal plates are held against each other through the minute projections. Therefore, the temperature of those regions goes excessively high. As a consequence, fused materials of the electrodes and the metal plates are deposited on those small regions. Also since the region in which the current concentrates may not necessarily be at the center of the electrode, the nugget produced by the welded region of the metal plates may be positioned not at the center of the electrode.

To eliminate the above drawbacks, there has been proposed a welding electrode having a surface to be held against a metal plate, which surface is shaped to uniformly destruct an oxide film on the metal plate when it is pressed by the electrode. When the electrode is pressed against the metal plate for welding the latter, the oxide film on the metal plate which is engaged by the electrode is broken off, allowing the electrode to contact a non-oxidized surface of the metal plate in an increased area. Consequently, inasmuch as the current is supplied uniformly from a wide surface area of the electrode and prevented from concentrate in a local region, the service life of the electrode is increased, and a good welding quality is achieved.

Japanese Laid-open patent publication No. 58-159986 discloses one such welding electrode which has a plurality of concentric annular grooves or a spiral groove of triangular or trapezoidal cross section defined in a tip surface thereof which is to be held against a metal plate to be welded. This publication also states the formation of waffle-like grooves in a welding electrode, but does not contain any detailed description of such grooves. The welding electrode with annular grooves or a spiral groove has annular ridges or a spiral ridge having a sharp crest. According to the publication, when the electrode is pressed against a metal plate to weld the latter, since the annular ridges or the spiral ridge destructs any oxide film on the metal plate, the area in which the electrode is held against a non-oxidized surface of the metal plate is increased for effective welding operation.

With the concentric annular grooves or the spiral groove on the electrode, however, the annular ridges or the spiral ridge becomes progressively smaller toward the center of the electrode. Particularly in an initial stage of welding operation, therefore, the welding current is likely to concentrate on a highly localized portion at the center of the electrode. The welding electrode disclosed in the above publication is therefore not effective to solve the above problems.

The concentric annular grooves or the spiral groove is relatively shallow and can easily be filled with fused materials or other deposits. When the annular grooves or the spiral groove is filled with fused materials or other deposits, the welding quality is lowered, and the welded region has irregular mechanical strengths. Any materials attached to or deposited on the tip of the electrode, they cannot easily be removed by a wire brush or the like because they are trapped in the grooves. Since the annular grooves or the spiral groove is formed in the electrode tip by an engine lathe, it is time-consuming to remachine the electrode to reconstruct the annular grooves or the spiral groove.

Japanese laid-open patent publication No. 62-156085 shows a welding electrode having surface irregularities that are formed by shot blasting. According to this publication, the surface irregularities are effective for increasing the service life of the electrode, so that the same electrode may be used to weld workpieces successively a number of times. Because the surface irregularities are formed by shot blasting, however, it is difficult to form convexities of uniform size on the electrode surface. As the surface irregularities are relatively small, when the electrode is used to weld metal plates such as aluminum alloy plates, impurities produced when the metal plates are welded are deposited quickly in the concavities, allowing the electrode to stick easily to the metal plate. Accordingly, the service life of the electrode cannot be increased as expected.

SUMMARY OF THE INVENTION

In view of the difficulties of the conventional electrodes for resistance welding, it is an object of the present invention to provide an electrode for resistance welding, which is capable of achieving a high welding quality and has an increased service life.

Another object of the present invention is to provide a method of manufacturing such an electrode for resistance welding.

Still another object of the present invention is to provide a method of resistance-welding workpieces for a high welding quality with such an electrode while increasing the service life of the electrode.

According to the present invention, there is provided an electrode for resistance-welding workpieces of metal by being pressed against superposed regions of the workpieces and supplying an electric current to the superposed regions to heat the same due to an electric resistance of the workpieces, the electrode comprising a body having a tip end for pressed engagement with one of the workpieces, and a matrix of tapered teeth disposed on the tip end of the body except for a center of the tip end, the teeth defining recesses therebetween, one of the recesses being positioned at the center of the tip end, the teeth being progressively higher from an outer circumferential edge of the tip end toward the center thereof.

For resistance-welding workpieces such as aluminum alloy plates, the electrode is pressed against one of the workpieces. At this time, the teeth near the center of the tip end of the electrode break an oxide film on the surface of the workpiece, and enter the workpiece. Thereafter, an electric current is supplied from the electrode to the workpieces. Since the teeth near the center of the tip end are higher than those teeth which are positioned on the outer circumferential edge of the tip end, they are first brought into contact with the workpiece in an initial phase of the welding process. The teeth, which are arranged in a matrix and of a tapered shape, are easily capable of breaking the oxide film on the surface of the workpiece.

In the initial stage of the welding process, the current is supplied from the teeth on the tip end of the electrode, and is prevented from concentrating in a localized region on the workpiece.

Since no tooth is provided at the center of the tip end of the electrode, no nugget is formed by the center of the tip end, but a plurality of nuggets are formed on the workpiece by the teeth near the center of the tip end. As the welding process proceeds, the workpiece is softened around the nuggets by the heat produced by the electric resistance thereof, allowing the tip end of the electrode to be pressed harder against and enter further into the workpiece. As a result, the tip end of the electrode contacts the workpiece in a wider area. As the area in which the tip end of the electrode and the workpiece contact each other increases, the area in which the current flows from the electrode to the workpiece also increases. The nuggets grow in size until they are united at the center surrounded thereby. Consequently, there is produced a single circular nugget whose center is aligned with the center of the tip end of the electrode. The single circular nugget continues to grow in the welding process until the lower teeth on the outer circumferential edge of the tip end of the electrode are brought into contact with the workpiece.

The electrode pressed against the workpiece leaves a welding mark indicative of the pattern of the teeth of the electrode. The welding mark has recesses formed complementarily by the teeth of the electrode and teeth formed complementarily by the recesses between the teeth of the electrode. Therefore, the welding mark has a tooth at its center corresponding to the center of the electrode.

The electrode according to the present invention abuts against the workpiece uniformly in a certain large area, rather than a small area. The pressure applied to the workpiece by the electrode, and the electric current supplied to the workpiece from the electrode are uniformly distributed in a certain range around the center of the electrode, making it possible to form a nugget having a desired depth and a desired radius. Insulating materials such as MgO, $Al_2O_3$, etc. are trapped in the recesses between the teeth of the electrode, keeping the teeth clean.

Preferably, each of the teeth is substantially in the shape of a pyramid, and includes a bottom having a length L, the ratio (L/t) of the length L to a thickness t of each of the workpieces being in the range of from 0.5 to 0.75. A tallest one of the teeth has a height H, the ratio (H/t) of the height H to the thickness t of each of the workpieces being in the range of from 0.1 to 0.4. The partly spherical convex hypothetical plane has a radius R of curvature in the range of:

$$25t+30 \text{ (mm)} \sim 50t+50 \text{ (mm)}.$$

The teeth are preferably arranged in a grid or diagonal pattern. Each of the recesses defined between the teeth preferably has a concave bottom surface to allow insulating materials trapped between the recesses to be easily removed with a wire brush or the like.

The electrode is useful when employed for resistance-welding aluminum alloy plates.

The teeth may be arranged in a pattern indicative of a character or a symbol, or may be arranged such that the recesses defined therebetween are arranged in a pattern indicative of a character or a symbol.

According to the present invention, there is also provided a method of resistance-welding workpieces of metal with a pair of electrodes, one of the electrodes having a body having a tip end for pressed engagement with one of the workpieces, and a matrix of tapered teeth arranged on the tip end of the body except for a center of the tip end, the teeth being arranged in a pattern indicative of a character or a figure, the method comprising the steps of pressing the electrodes against superposed regions of the workpieces, supplying an electric current to the superposed regions to heat the same due to an electric resistance of the workpieces, and imprinting one of the superposed regions with the pattern of the teeth, leaving a welding mark thereon which has a character or figure pattern complementary to the pattern in which the teeth are arranged.

According to the present invention, there is further provided a method of manufacturing an electrode for resistance-welding workpieces of metal by being pressed against superposed regions of the workpieces and supplying an electric current to the superposed regions to heat the same due to an electric resistance of the workpieces, the method comprising the steps of producing a provisional electrode having a substantially smooth partly spherical convex surface on a tip end thereof, and pressing a toothed pressing surface of a shaper jig against the substantially smooth partly spherical convex surface of the provisional electrode at least once to form a matrix of tapered teeth on the partly spherical convex surface of the provisional electrode, thereby providing the electrode.

The electrode with tapered teeth on its tip end can easily be manufactured simply by pressing the pressing surface of the shaper jig and the substantially smooth partly spherical convex surface of the provisional electrode against each other. The provisional electrode may be produced by grinding an electrode blank, or molding a powdery mixture of electrolytic copper and chromium and sintering the molded electrode.

The pressing surface of the shaper jig may have a plurality of tapered recesses arranged in a uniform pattern and a plurality of teeth disposed between the recesses, or a plurality of parallel grooves of substantially V-shaped cross section arranged in a stripe pattern and a plurality of ridges defined between the grooves. In the case where the shaper jig with the parallel grooves and ridges is employed, after the pressing surface of the shaper jig and the substantially smooth partly spherical convex surface of the provisional electrode are pressed against each other to form a plurality of ridges in a stripe pattern on the substantially smooth partly spherical convex surface, the shaper jig is rotated to orient the ridges on the substantially smooth partly spherical convex surface in a direction across the grooves of the pressing surface, and then the pressing surface of the shaper jig and the substantially smooth partly spherical convex surface of the provisional electrode are pressed against each other again to form the ridges on the substantially smooth partly spherical convex surface complementarily in the grooves. The pressing and rotating steps may further be repeated. If the shaper jig is rotated 90° after the shaper jig is pressed against the provisional electrode, then the teeth formed on the electrode are each substantially in the shape of a quadrangular pyramid and are arranged in a grid pattern. If the shaper jig is rotated 60° twice and the shaper jig is pressed against the provisional electrode three times, then the teeth formed on the electrode are each substantially in the shape of a triangular pyramid, and are arranged in a diagonal pattern.

According to the present invention, there is also provided a method of manufacturing an electrode for resistance-welding workpieces of metal by being pressed against superposed regions of the workpieces and supplying an electric current to the superposed regions to heat the same due to an electric resistance of the workpieces, the method comprising the steps of filling a powdery material in a molding hole in a mold having a bottom surface with a plurality of tapered recesses arranged in a uniform pattern, pressing the powdery material in the molding hole to provide a molded provisional electrode having a plurality of tapered teeth on a tip end thereof which are complementary to the tapered recesses, and sintering the molded provisional electrode into the electrode.

With the above manufacturing method, the electrode with the tapered teeth on its tip end can be produced directly by molding and then sintering the powdery material. Consequently, the electrode can easily be manufactured in a short period of time.

According to the present invention, furthermore, there is provided a method of resistance-welding workpieces of metal with a pair of positive and negative electrodes, the positive electrode having a body having a tip end for pressed engagement with one of the workpieces, and a matrix of tapered teeth arranged on the tip end of the body, the negative electrode having a body having a tip end with a partly spherical convex surface for pressed engagement with the other workpiece, the method comprising the steps of pressing the tip ends of the positive and negative electrodes respectively against superposed regions of the workpieces, and supplying an electric current to the superposed regions to heat the same due to an electric resistance of the workpieces.

The above resistance welding method allows the electrode to be used for a long period of time, i.e., the number of times that the electrode can be used to successively weld the workpieces is increased.

More specifically, the positive electrode for supplying the welding current is more liable to stick to the workpiece of metal than the negative electrode. For example, if two metal plates are resistance-welded, nuggets are formed symmetrically on opposite sides of the interface between the metal plates during an initial phase of the welding process. As the number of times that the electrodes are used to weld the metal plates increases, thicker nuggets are formed near the positive electrode, and thinner nuggets are formed near the negative electrode. The localized nuggets are responsible for heating the positive electrode, causing it to stick to or alloy with the metal plate. As a result, the positive electrode tends to be damaged soon.

However, since the positive electrode has a plurality of tapered teeth on its tip end, when the positive electrode is pressed against the workpiece, the teeth break an oxide film on the surface of the workpiece, permitting the tip end of the electrode to contact a non-oxidized portion of the workpiece in a relatively wide area. Accordingly, the welding current supplied from the positive electrode is prevented from concentrating in a limited area on the workpiece, thus preventing localized heating. The positive electrode is rendered resistant to sticking to the workpiece, and has a relatively long service life. The negative electrode with the partly spherical convex surface on its tip end leaves a smooth welding mark on the workpiece when the negative electrode is pressed against the workpiece.

According to the present invention, there is also provided a method of resistance-welding workpieces of metal with a pair of electrodes, one of the electrodes having a body having a tip end for pressed engagement with one of the workpieces, and a matrix of tapered teeth arranged on the tip end of the body, the other of the electrodes having a body having a tip end with a partly spherical convex surface for pressed engagement with the other workpiece, the method comprising the steps of pressing the tip end of the one electrode against the one of the workpieces in a position inward of the workpieces, pressing the tip end of the other electrode against the other of the workpiece in a position outward of the workpieces, and supplying an electric current to superposed regions of the workpieces to heat the same due to an electric resistance of the workpieces.

Inasmuch as the electrode with the teeth on its tip end are pressed against the workpiece on its inner surface, the inner surface of the workpiece is imprinted with a welding mark indicative of the pattern of the teeth of the electrode. The electrode with the partly spherical convex surface on its tip end is pressed against the workpiece on its outer surface, so that any welding mark imprinted on the outer surface of the workpiece is smooth and free of surface irregularities. The outer surface of the welded workpiece is therefore sightly in appearance.

The welding process may be a DC or AC resistance welding process.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 16(a) and 16(h) are plan views showing modified patterns of teeth for the electrode for resistance welding according to the present invention;

FIGS. 16(i) and 16(j) are plan views showing welding marks produced when workpieces are welded using electrodes with modified patterns of teeth shown in FIGS. 16(a) and 16(b);

FIGS. 17 through 20 are elevational views, partly in cross section, showing a method of manufacturing an electrode for resistance welding according to an embodiment of the present invention;

DETAILED DESCRIPTION OF THE PREFERRED EMBODIMENTS

Figure 1:
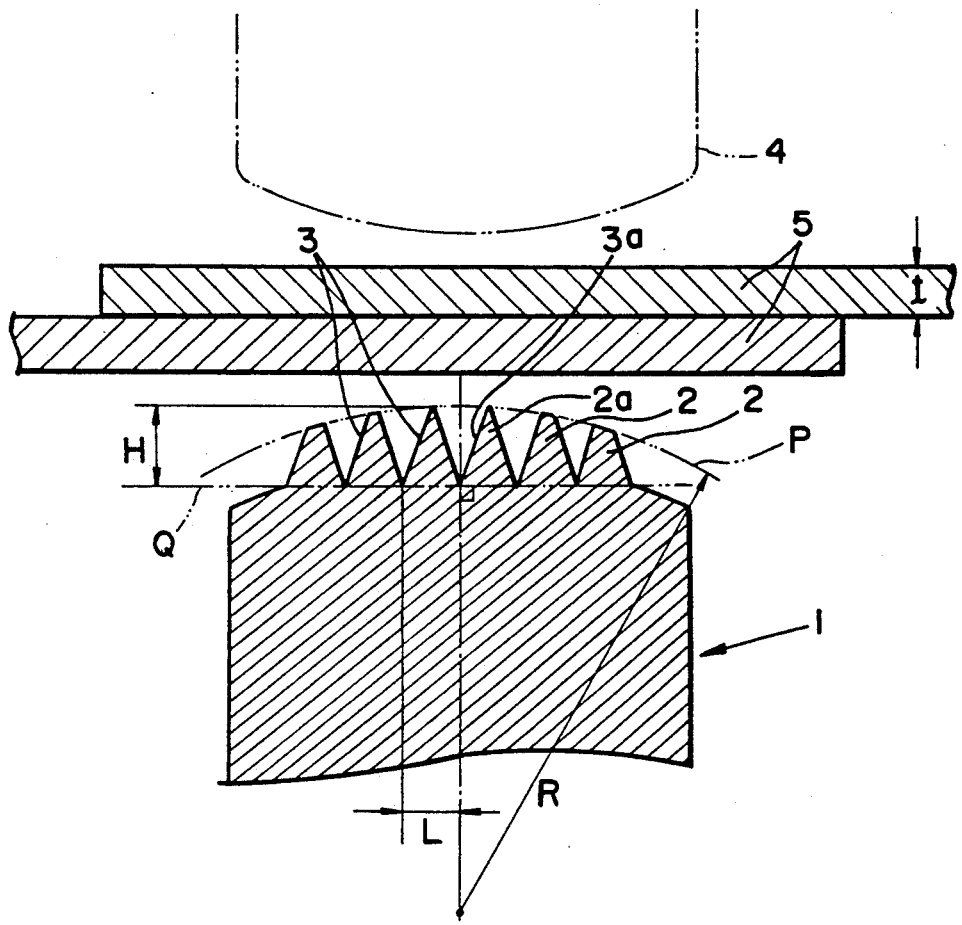
FIG. 1 is a vertical cross-sectional view of an electrode for resistance welding according to an embodiment of the present invention.
Figure 2:
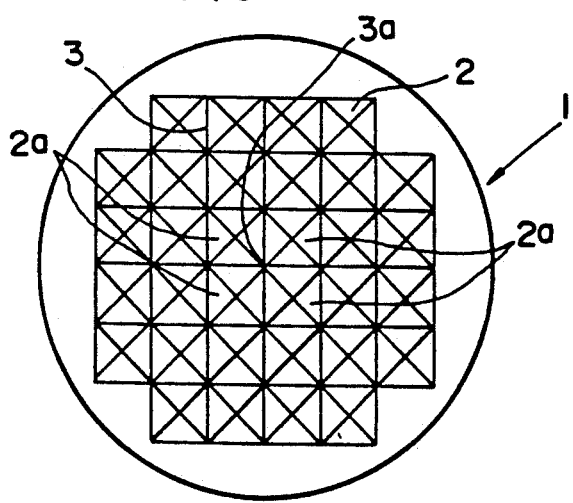
FIG. 2 is a plan view of a tip end of the electrode shown in FIG. 1.

FIGS. 1 and 2 show an electrode for resistance welding according to an embodiment of the present invention.

As shown in FIGS. 1 and 2, the electrode, generally designated by the reference numeral 1, has a cylindrical body having a tip end for pressed engagement with a workpiece to be welded and a matrix of spaced pyramidal teeth 2 on the tip end of the cylindrical body. The pyramidal teeth 2 may have sharply pointed ends, blunt ends, or curved ends.

As shown in FIG. 2, the teeth 2 are each in the shape of a quadrangular pyramid, and are arranged in a grid pattern except at the center of the tip end of the electrode 1. A recess 3 is defined between two adjacent ones of the teeth 2. A recess 3a is defined at the center of the tip end of the electrode 1 between four surrounding teeth 2a. Since the teeth 2 are arranged in a grid pattern, the recesses 3 communicate with each other around the teeth 2, providing orthogonal grooves extending vertically and horizontally (as viewed in FIG. 2) in a mesh-like formation. The recesses 3 have bottoms continuous to the outer circumferential surface of the electrode 1.

Figure 3:
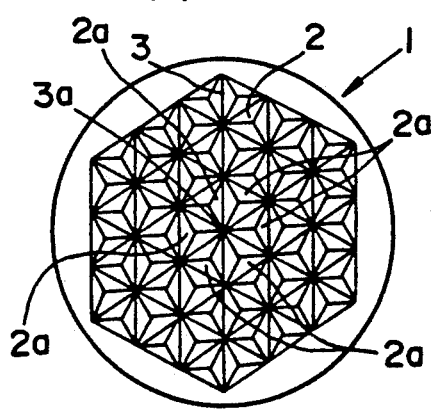
FIG. 3 is a plan view of a modified tip end of the electrode.

FIG. 3 shows a modification in which each of the teeth 2 is in the shape of a triangular pyramid, and the teeth 2 are arranged in a diagonal pattern such that the triangular bottoms of adjacent ones of the teeth 2 have adjoining sides except at the center of the tip end of the electrode 1. A recess 3a at the center of the tip end of the electrode 1 is defined between five surrounding teeth 2a.

As shown in FIG. 1, the teeth 2, which are each in the shape of a quadrangular pyramid, have more sharply pointed ends as they are positioned more closely to the center of the electrode 1. At the outer circumferential edge of the tip end of the electrode 1, the teeth 2 are of a prismoidal shape having a partly spherical end. More specifically, a hypothetical plane P joining the tips of the teeth 2, i.e., a tip plane of the electrode 1 including the teeth 2, is a partly spherical convex plane whose center of curvature lies on the central axis of the electrode 1, and a hypothetical plane Q joining the bottoms of the recesses 3 between adjacent ones of the teeth 2 is a flat plane lying perpendicularly to the central axis of the electrode 1. Therefore, the height of the teeth 2 from the hypothetical plane Q is progressively greater from the outer circumferential surface to the center of the electrode 1. Those teeth 2 which are equidistant from the center of the electrode 1 have the same height from the hypothetical plane Q.

The electrode 1 is used in combination with an electrode 4 for welding a pair of metal plates 5 disposed therebetween. The ratio (L/t) of the length L of the bottom of each of the teeth 2 to the thickness t of each of the metal plates 5 is in the range of from 0.5 to 0.75, and the ratio (H/t) of the height H of the tallest teeth 2a to the thickness t of each of the metal plates 5 is in the range of from 0.1 to 0.4. The hypothetical partly spherical plane P of the electrode 1 has a radius R of curvature which is in the following range with respect to the thickness t of the metal plates 5:

$$R\ 25t+30\ (mm) \sim 50t+50\ (mm).$$

The reasons why the ratios (L/T) and (H/t) and the radius R of curvature are in the above ranges will be described later on.

Resistance welding using the electrode 1 will be described below. The electrode 1 and the electrode 4, shown by phantom lines in FIG. 1, are provided in a resistance welding machine (not shown), and the metal plates 5 disposed as workpieces between the electrodes 1, 4 are aluminum alloy plates or the like. The electrode 4 has a partly spherical convex tip end surface, but does not have any teeth similar to those of the electrode 1.

The electrodes 1, 4 are pressed against superposed regions of the metal plates 5, and an electric current flows through the metal plates 5 between the electrodes 1, 4. The superposed regions of the metal plates 5 are then heated by the resistance of the metal plates 5 to the electric current, forming nuggets (not shown) to weld the metal plates 5 to each other.

In an initial phase of the resistance welding process, the electrode 1 contacts the corresponding metal plate 5 through the four teeth 2a which are the highest among the teeth 2 and have pointed tip ends. As the metal plate 5 is softened due to the heat generated thereby, the teeth 2a enter the metal plate 5. If the metal plates 5 are aluminum alloy plates, for example, then the teeth 2a break any oxide film on the surface of the metal plate 5, and bite into contact with a non-oxidized region of the metal plate 5. Therefore, the electric current which flows from the electrode 1 to the metal plate 5 in the initial stage of the resistance welding process does not concentrate on localized areas of the electrode 1, but is distributed uniformly to the teeth 2a. The nuggets are generated around the region where the teeth 2a are held in contact with the metal plate 5. As the resistance welding process proceeds, the other teeth 2 than the teeth 2a are brought into contact with and enter the metal plate 5 progressively in the order from those near the teeth 2a toward those remote from the teeth 2a. The distribution of the current flowing from the electrode 1 to the metal plate 5 spreads radially outwardly, and so do the nuggets around the central axis of the electrode 1.

The electrode 1 having the pattern of the teeth 2 as shown in FIG. 3 also operates in the same manner as described above.

Figure 4:
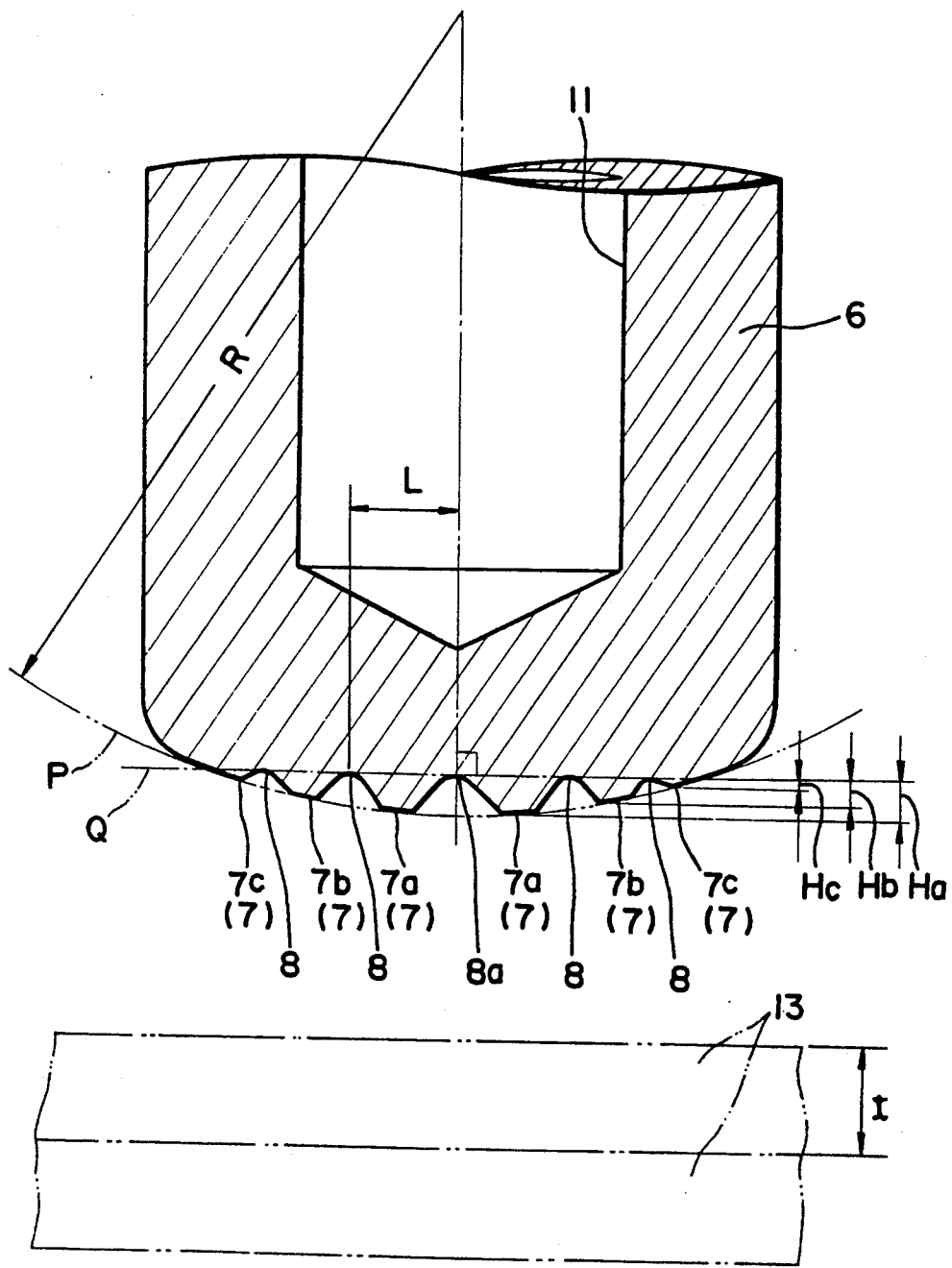
FIG. 4 is a vertical cross-sectional view of an electrode for resistance welding according to another embodiment of the present invention.
Figure 5:
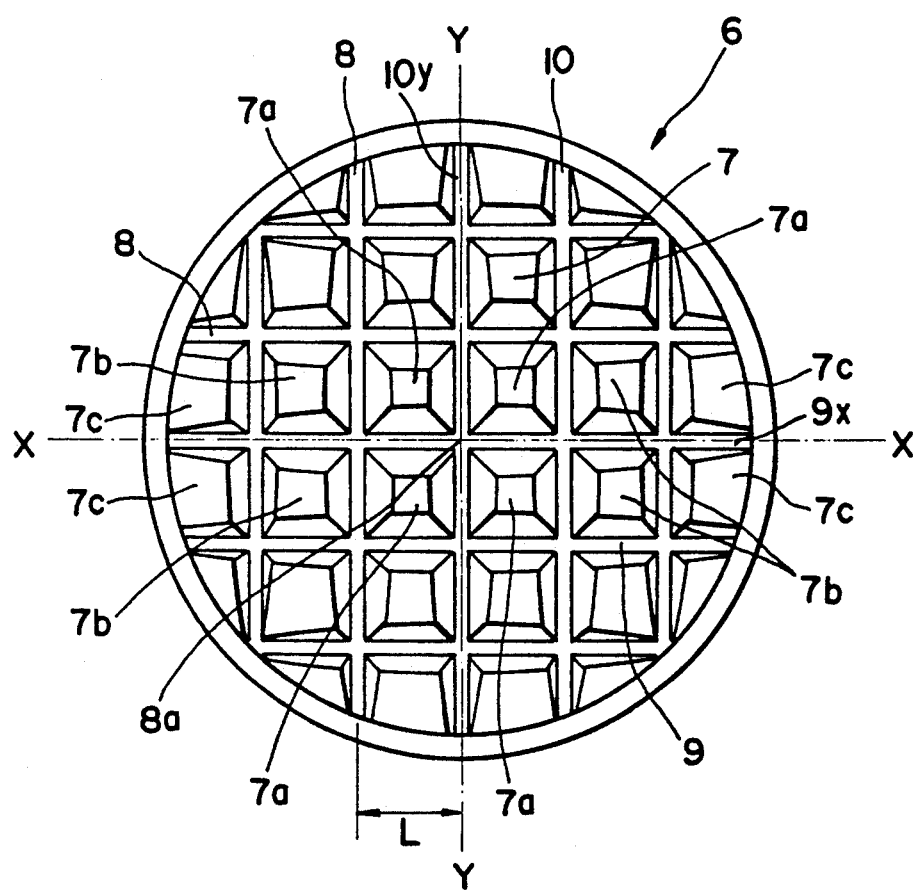
FIG. 5 is a plan view of a tip end of the electrode shown in FIG. 4.
Figure 6:
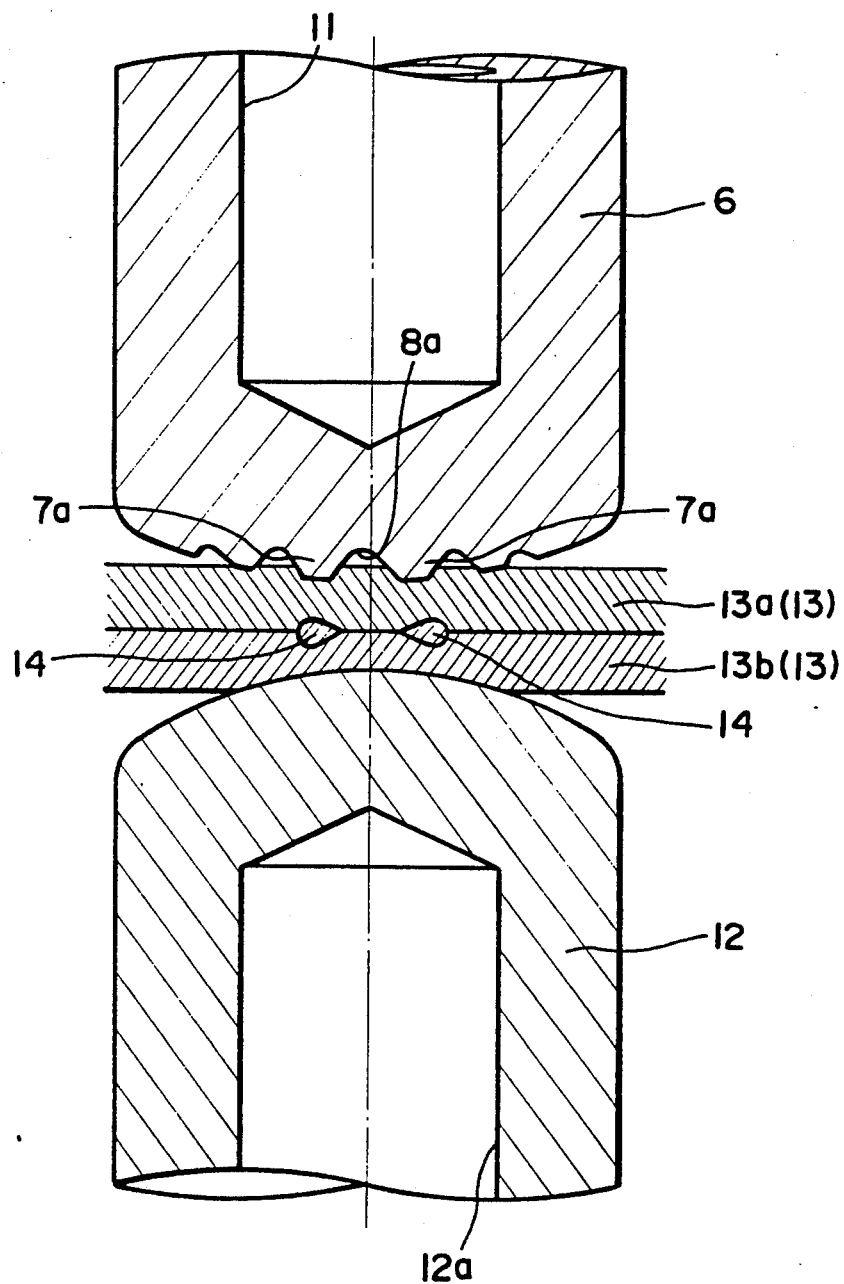
FIGS. 6 through 9 are vertical cross-sectional views showing a resistance welding process using the electrode shown in FIG. 4.

FIGS. 4 through 6 show an electrode for resistance welding according to another embodiment of the present invention.

As shown in FIGS. 4 and 5, the electrode, generally designated by the reference numeral 6, is basically of the same configuration as that of the electrode 1 shown in FIGS. 1 and 2. As shown in FIG. 4, the electrode 6 has a matrix of spaced pyramidal teeth 7 on its tip end. More specifically, as shown in FIG. 5, the teeth 7 are each in the shape of a quadrangular prismoid, and are arranged in a grid pattern except at the center of the tip end of the electrode 6. Recesses 8 that communicate with each other are defined between two adjacent ones of the teeth 7. The recesses 8 include parallel grooves 9 extending in an X-axis direction (FIG. 5) and parallel grooves 10 extending in a Y-axis direction normal to the X-axis direction, and have bottoms continuous to the outer circumferential surface of the electrode 6. Of these grooves 9, 10, a pair of central grooves 9x, 10y intersects with each other at the center of the tip end of the electrode 6, and jointly defines a recess 8a that is surrounded by four teeth 7a at the center of the tip end of the electrode 6.

As shown in FIG. 4, each of the recesses 8 (i.e., the grooves 9 and the grooves 10) has a concave bottom surface.

The tip ends of the teeth 7 that are located more closely to the center of the electrode 6 are more sharply pointed, and have a partly spherical convex surface. More specifically, a hypothetical plane P joining the tips of the teeth 7, i.e., a tip plane of the electrode 6 including the teeth 7, is a partly spherical convex plane whose center of curvature lies on the central axis of the electrode 6 and which has a radius R of curvature, and a hypothetical plane Q joining the bottoms of the recesses 8 between adjacent ones of the teeth 7 is a flat plane lying perpendicularly to the central axis of the electrode 6. Therefore, the height of the teeth 7 from the hypothetical plane Q is progressively greater from the outer circumferential surface to the center of the electrode 6. Those teeth 7 which are equidistant from the center of the electrode 6 have the same height from the hypothetical plane Q. For example, if it is assumed that the teeth 7a that are closest to the center of the electrode 6 have a height Ha, the teeth 7b that are second closest to the center of the electrode 6 have a height Hb, and the teeth 7c that are remotest from the center of the electrode 6, then these heights Ha, Hb, Hc are in the relationship: Ha>Hb>Hc.

The electrode 6 has an axial hole 11 defined therein which will be supplied with a coolant when the electrode 6 is used in a resistance welding process.

A process of resistance-welding aluminum alloy plates with a direct current using the electrode 6 will be described below with reference to FIGS. 6 through 9.

In FIG. 6, the electrode 6 is provided in combination with a confronting electrode 12 in a resistance welding machine (not shown), and aluminum alloy plates 13a, 13b are placed between the electrodes 6, 12 such that those regions of the aluminum alloy plates 13a, 13b to be welded are superposed between the electrodes 6, 12. The electrode 12 has a partly spherical convex tip end surface, but does not have any teeth similar to those of the electrode 6. The electrode 12 has an axial hole 12a defined therein for receiving a coolant, as is the case with the electrode 6. The electrodes 6, 12 are used as positive and negative electrodes, respectively.

After the aluminum alloy plates 13a, 13b are placed between the electrodes 6, 12, the electrodes 6, 12 are pressed against the aluminum alloy plates 13a, 13b, and an electric current flows through the aluminum alloy plates 13a, 13b between the electrodes 6, 12.

Initially, as shown in FIG. 6, the four teeth 7a which are the highest among the teeth 7 break any oxide film on the surface of aluminum alloy plate 13a, and bite into contact with a non-oxidized region of the aluminum alloy plate 13a. Therefore, the electric current flows from the electrode 6 to the aluminum alloy plates 13a, 13b through the contacting teeth 7a, and those regions of the interface between the aluminum alloy plates 13a, 13b which correspond to the teeth 7a are heated by the resistance of the aluminum alloy plate 13a, forming nuggets 14. Since the four teeth 7a are positioned around the central recess 8a of the electrode 6, there are four nuggets 14 formed around the center of the welded region which corresponds to the center of the electrode 6. As these teeth 7a are more sharply pointed than the other teeth 7, they reliably and smoothly break the oxide film of the aluminum alloy plate 13a and contact the non-oxidized portion thereof. Therefore, in the initial stage of the resistance welding process, the current which flows from the current 6 to the aluminum alloy plate 13a does not concentrate on localized areas of the electrode 6, but is distributed uniformly to the teeth 7a. The nuggets corresponding to the respective teeth 7a are generated uniformly.

Figure 7:
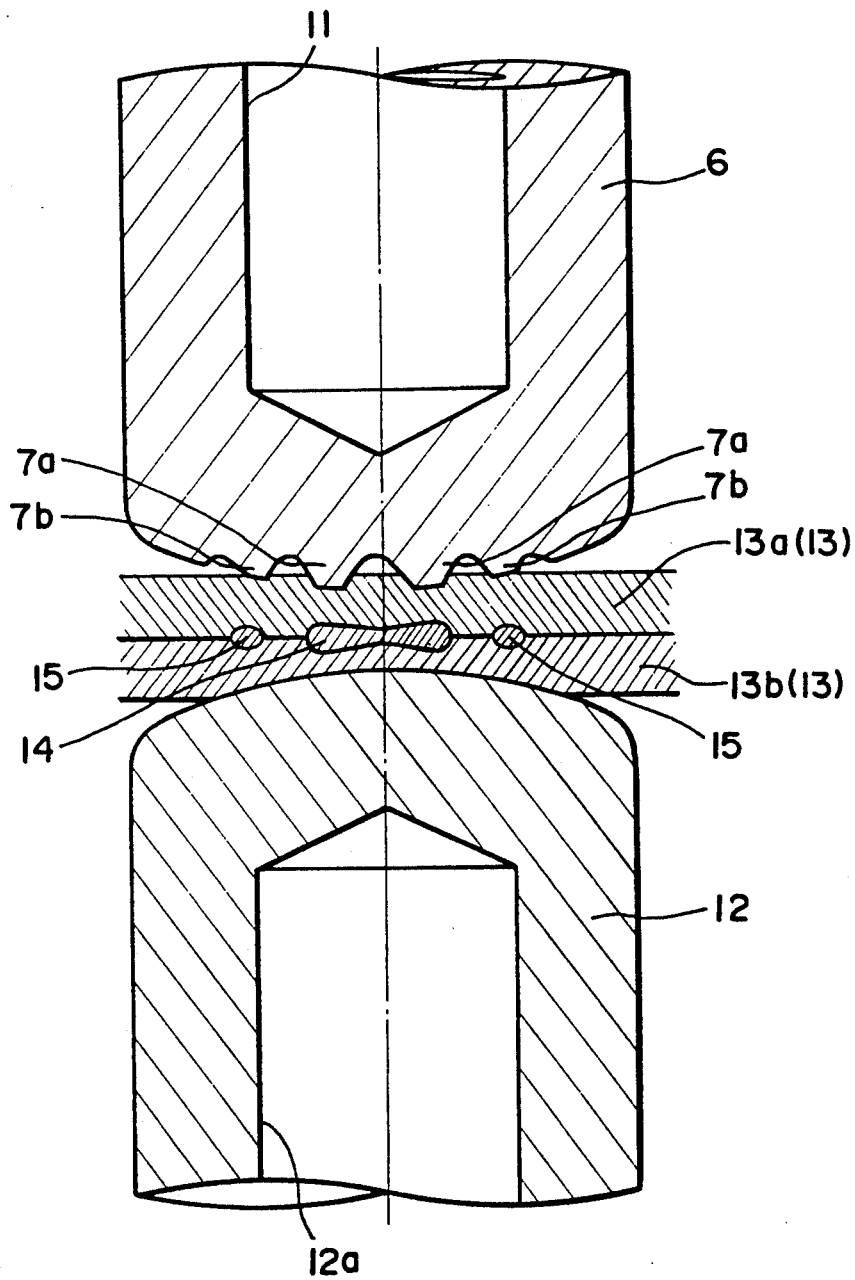

As the resistance welding process proceeds, the aluminum alloy plates 13a, 13b around the nuggets 14 are softened by the heat due to the resistance thereof, allowing the electrodes 6, 12 pressed against the aluminum alloy plates 6, 12 to enter more deeply into the non-oxidized portions of the aluminum alloy plates 13a, 13b. As illustrated in FIG. 7, the teeth 7b lower than the teeth 7a of the electrode 6 contact the non-oxidized portion of the aluminum alloy plate 13a, and the electric current also flows to the aluminum alloy plates 13a, 13b through the contacting teeth 7b. At this stage, new nuggets 15 are formed in those regions in the interface between the aluminum alloy plates 13a, 13b which correspond to the teeth 7b, and the previously generated nuggets 14 corresponding to the teeth 7a grow to the point where they are united together at the center of the welded region. The current which flows from the electrode 6 to the aluminum alloy plate 13a at this time is distributed not only to the teeth 7a but also to the teeth 7b, thus preventing the areas of the aluminum alloy plates 13a, 13b corresponding to the teeth 7a from being excessively heated.

Figure 8:
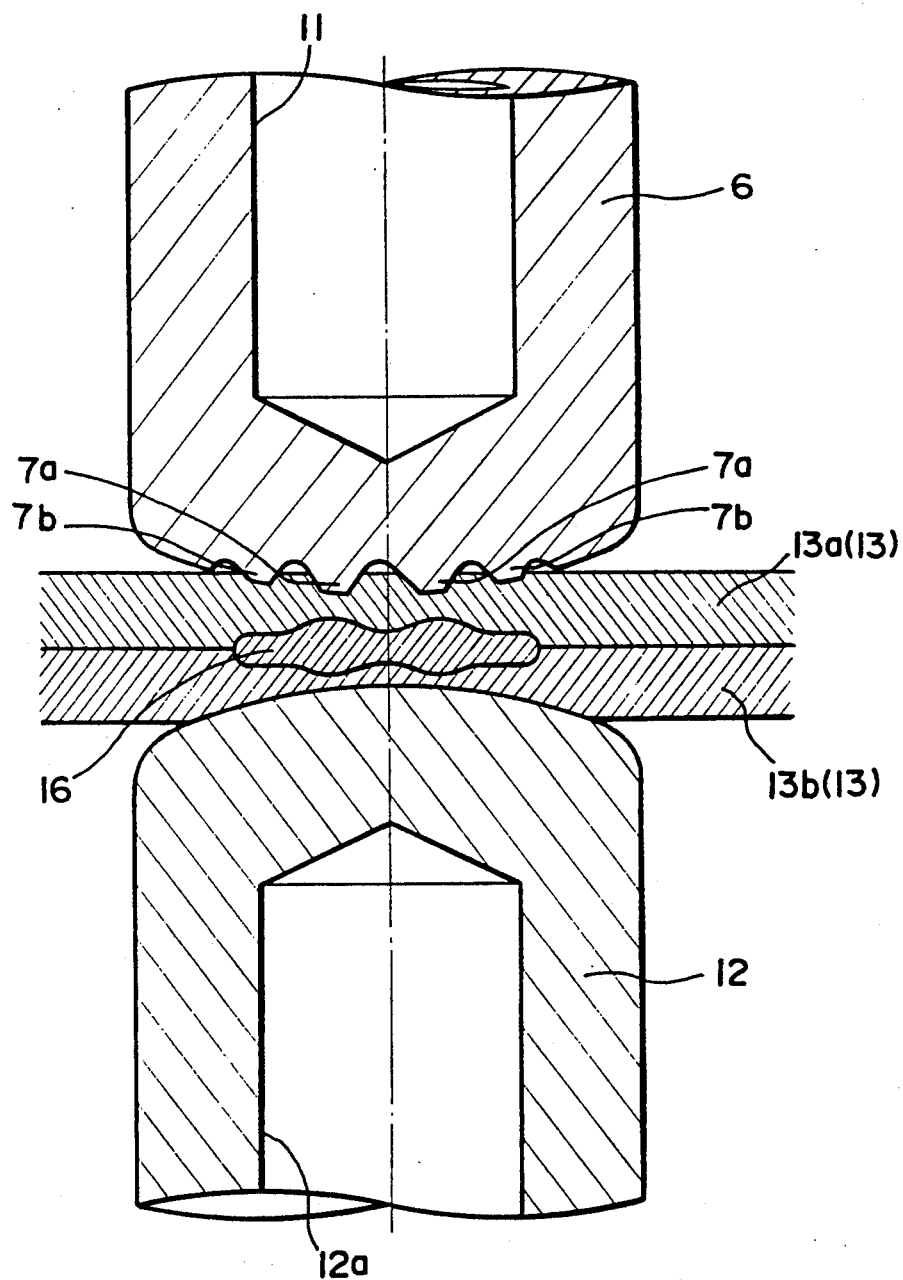

Upon further progress of the resistance welding process, as shown in FIG. 8, the teeth 7a, 7b of the electrode 6 enter more deeply into the aluminum alloy plate 13a and contact the non-oxidized portion thereof through a wider area. As a result, the area through which the current flows from the electrode 6 to the aluminum alloy plate 13 also increases. The nuggets 14, 15 grow to the extent that the nuggets 15 are joined to the nuggets 14, resulting in a single circular nugget 16.

Figure 9:
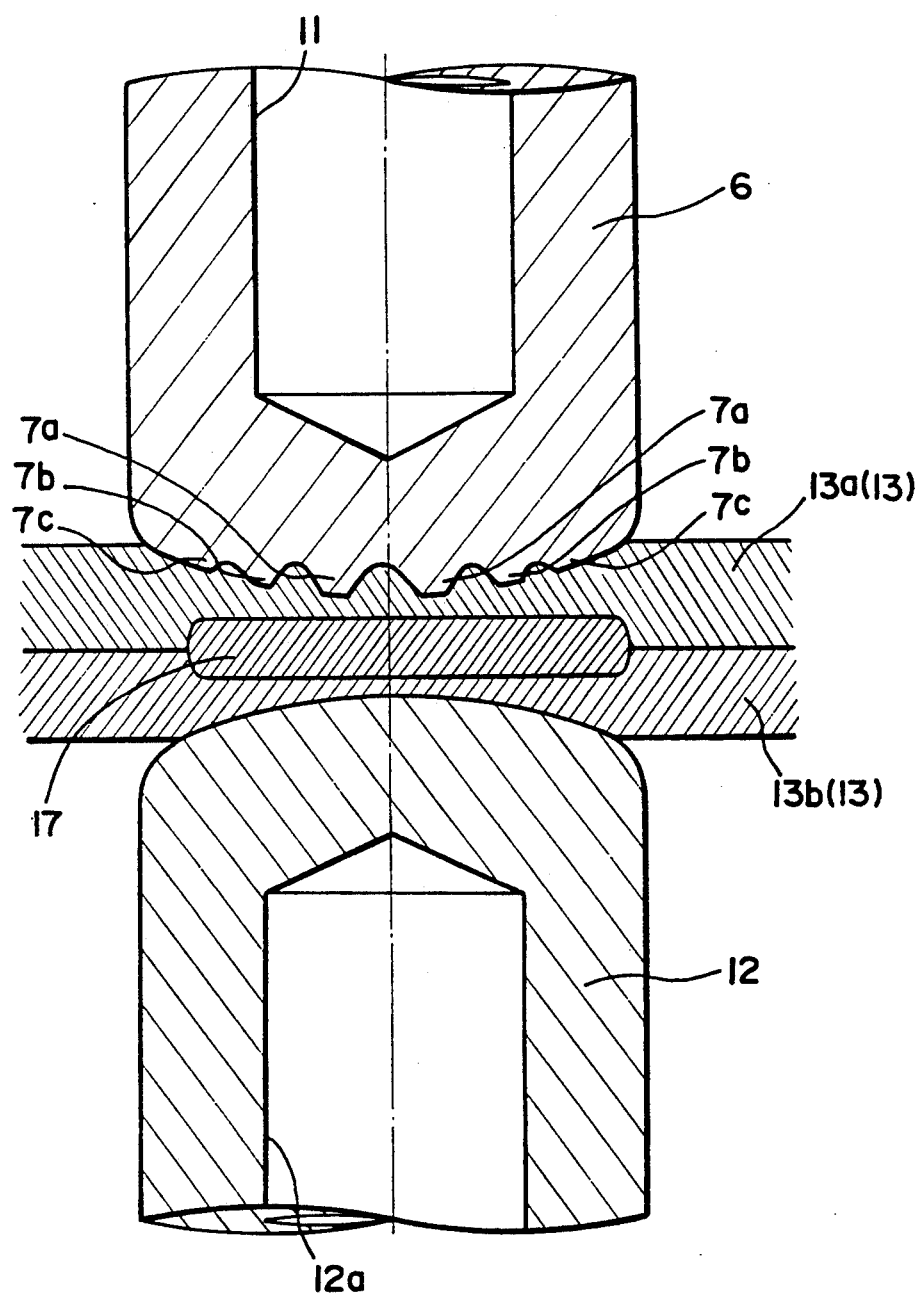

The nugget 16 thus generated continuously grows until the lowest teeth 7c of the electrode 6 are finally brought into contact with the non-oxidized portion of the aluminum alloy plate 13a. At the end of the resistance welding process, as shown in FIG. 9, a nugget 17 is formed in the interface between the aluminum alloy plates 13a, 13b which has its center aligned with the centers of the tip ends of the electrodes 6, 12.

The electrode 6 also has dimensional limitations similar to those of the electrode 1 shown in FIGS. 1 and 2. More specifically, as shown in FIGS. 4 and 5, the ratio (L/t) of the length L of the bottom of each of the teeth 7 to the thickness t of each of the aluminum alloy plates 13 (shown by phantom lines in FIG. 4) is in the range of from 0.5 to 0.75, and the ratio (H/t) of the height H of the tallest teeth 7a to the thickness t of the aluminum alloy plates 13 is in the range of from 0.1 to 0.4. The hypothetical partly spherical plane P of the electrode 6 has a radius R of curvature which is in the following range with respect to the thickness t of the aluminum alloy plates 13:

$$R: 25t+30 \text{ (mm)} \sim 50t \cdot 50 \text{ (mm)}.$$

With the electrode 6, the ratios (L/t) and (H/t) are 0.625 and 0.25, respectively, and the radius R of curvature is 150 mm with the thickness t being 3 mm.

Figure 10:
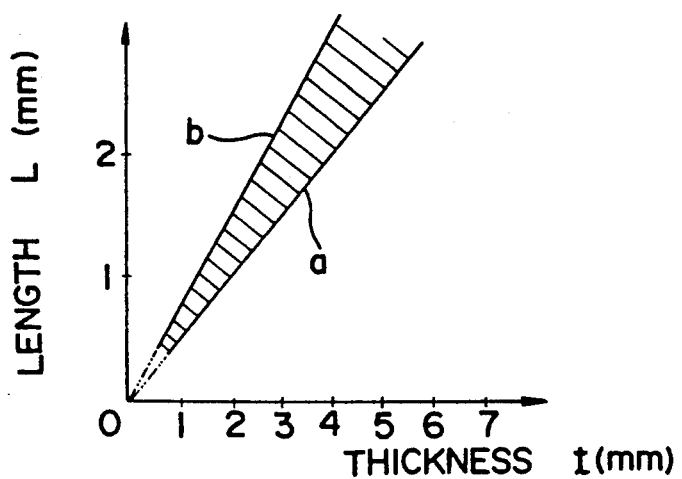
FIG. 10 is a graph showing the relationship between the length of the bottom of a tooth of the electrode for resistance welding according to the present invention and the thickness of a metal plate welded by the electrode.
Figure 11:
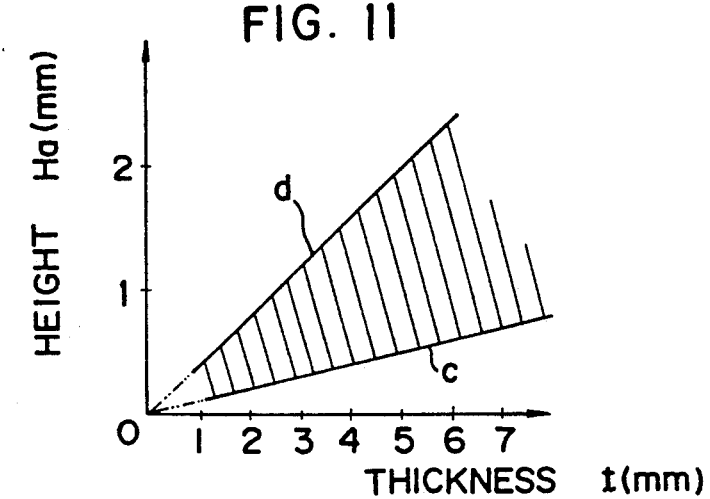
FIG. 11 is a graph showing the relationship between the length of the height of the tooth of the electrode for resistance welding according to the present invention and the thickness of the metal plate welded by the electrode.
Figure 12:
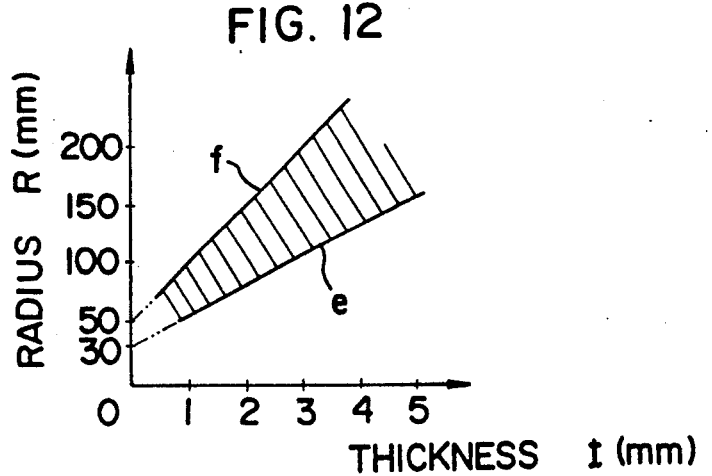
FIG. 12 is a graph showing the relationship between the radius of curvature of a partly spherical tip surface of the electrode for resistance welding according to the present invention and the thickness of the metal plate welded by the electrode.

For the electrode 1 shown in FIGS. 1 and 2 and the electrode 6 shown in FIGS. 4 and 5, the ratios (L/t) and (H/t) and the radius R of curvature are selected in the above ranges for the following reasons:

FIGS. 10 through 12 are graphs showing the relationship between the length L, the height Ha, the radius R of curvature, and the thickness t as their values vary when the aluminum alloy plates 13, according to JIS-A8152P, are welded using the electrode according to the present invention.

In FIG. 10, when a point (L, t) represented by certain values of the length L and the thickness t was in a region below a straight line a, i.e., when the length L was relatively small compared with the thickness t, the recesses 8 between the teeth 7 tended to be clogged with fused materials produced in the resistance welding process. This means that since the length L is relatively small compared with the thickness t, the teeth 7 are closely spaced at relatively small intervals, causing the recesses 8 between the teeth 7 to be clogged with fused materials produced in the resistance welding process. When the point (L, t) was in a region above a straight line b that is higher than the straight line a, i.e., when the length L was relatively large compared with the thickness t, the aluminum alloy plates 13 were likely to become deformed by the electrode 6 pressed thereagainst, and good nuggets were less liable to be formed. This means that since the length L is relatively large compared with the thickness t, the teeth 7 are spaced at relatively large intervals, and hence held against the aluminum alloy plates 13 at largely spaced points, with the result that nuggets formed at the teeth 7 are less liable to be joined together.

Therefore, the point (L, t) should preferably be in the range between the straight lines a, b, i.e., the ratio (L/t) should preferably be in the range of from 0.5 to 0.75.

In FIG. 11, when a point (Ha, t) represented by certain values of the height Ha and the thickness t was in a region below a straight line c, i.e., when the height Ha was relatively small compared with the thickness t, the recesses 8 between the teeth 7 tended to be clogged with fused materials produced in the resistance welding process. This means that since the height Ha is relatively small compared with the thickness t, the recesses 8 between the teeth 7 are relatively shallow, and can easily be clogged with fused materials produced in the resistance welding process. When the point (Ha, t) was in a region above a straight line a that is higher than the straight line c, i.e., when the height Ha was relatively large compared with the thickness t, the teeth 7 were too high, and tended to get damaged when the electrode 6 was pressed against the aluminum alloy plates 13. Particularly, the teeth 7a close to the center of the electrode 6 entered deeply into the aluminum alloy plate 13, tending to damage the aluminum alloy, plate 13, and only those nuggets generated near the 7a grew excessively, failing to produce a good joined nugget.

Therefore, the point (Ha, t) should preferably be in the range between the straight lines c, d, i.e., the ratio (Ha/t) should preferably be in the range of from 0.1 to 0.4.

In FIG. 12, when a point (R, t) represented by certain values of the radius R of curvature and the thickness t was in a region below a straight line e, i.e., when the radius R of curvature was relatively small compared with the thickness t, a mark produced on the aluminum alloy plate 13 when it was pressed by the electrode 6 was too deep, making the welded region unsightly. The aluminum alloy plate 13 with the deep mark tended to warp, producing a gap between the superposed regions of the aluminum alloy plates 13 with sparks produced across the gap. When the point (R, t) was in a region above a straight line f that is higher than the straight line e, i.e., when the radius R of curvature was relatively large compared with the thickness t, difficulty arose in welding the aluminum alloy plates 13 in a small region, and many teeth 7 were liable to contact the aluminum alloy plate 13 in the initial welding stage, causing the electrode 6 to contact the aluminum alloy plate 13 in a large area. Thus, the welding current was distributed in too wide a region, and nuggets did not grow smoothly.

Therefore, the point (R, t) should preferably be in the range between the straight lines e, f, i.e., the radius R of curvature should preferably be in the range:

$$R: 25t+30 \text{ (mm)} \sim 50t+50 \text{ (mm)}.$$

As described above, in the resistance welding process using the electrode 6, the teeth 7 of the electrode 6 break the oxide film of the aluminum alloy plate 13a and are brought into reliable contact with the non-oxidized portion of the aluminum alloy plate 13a. Consequently, the teeth 7 contact the non-oxidized portion in a sufficiently large area, and the welding current is prevented from concentrating in localized areas. Since the size of the teeth 7 and the radius R of curvature of the tip end (indicated by the hypothetical plane P) of the electrode 6 are suitably selected with respect to the thickness t of each of the aluminum alloy plates 13a, 13b according to the above ratios, the welding current flows from the four teeth 7a around the central recess 8a of the electrode 6 to the aluminum alloy plates 13a, 13b in the initial phase of the welding process, so that the welding current does not concentrate too much in localized areas and is prevented from being distributed in too wide an area. The nuggets 14 are thus allowed to be generated and grown smoothly around the center of the welded region which corresponds to the center of the electrode 6. As the welding process goes on, more teeth 7 are brought into contact with the non-oxidized portion of the aluminum alloy plate 13a in the direction toward the outer circumferential surface of the electrode 6, so that the nuggets 14, 15, 16 grow highly smoothly until finally the nugget 17 is formed.

Inasmuch as the welding current does not concentrate in localized areas of the electrode 6 and the size of the teeth 7 and the radius R of curvature of the tip end (indicated by the hypothetical plane P) of the electrode 6 are suitably selected with respect to the thickness t of each of the aluminum alloy plates 13a, 13b, as described above, any fused materials produced in the welding process are prevented from being attached to and hence alloyed with the electrode 6. Therefore, the electrode 6 has an increased service life, increasing the number of times (hereinafter also referred to as "successive welding count") that the electrode 6 can be used to successively weld the aluminum alloy plates 13a, 13b with good nuggets 17. The electrode 6 was not damaged until after it was used to successively weld the aluminum alloy plates 600 times, and was possible to produce good nuggets 17 of predetermined depth and radius until after it was used to successively weld the aluminum alloy plates 800 times.

As described above, the teeth 7 of the electrode 6 are arranged in a grid pattern, and the orthogonal grooves 9, 10 (see FIG. 5) between the teeth 7 have bottoms continuous to the outer circumferential surface of the electrode 6. Therefore, any fused materials deposited in the grooves 9, 10 can easily be removed using a wire brush or the like. The concave bottom surfaces of the grooves 9, 10 (recesses 8) are effective for easy removal of fused materials from the grooves 9, 10, and also to prevent fused materials from sticking thereto.

When the number of times that the electrode 6 has been used to successively weld the aluminum alloy plates 13a, 13b, or the successive welding count, is relatively small, the surface of the aluminum alloy plate 13a has clear welding marks (not shown) imprinted by the teeth 7. Each of such welding marks has recesses corresponding to the teeth 7 and lands corresponding to the recesses 8. When the teeth 7 are flattened or fused materials or other foreign matter is deposited in the grooves 9, 10 in repeated welding operation, the welding marks on the aluminum alloy plate 13a become unclear. Therefore, the time for replacement of the electrode 6 can easily be determined by checking the welding marks on the aluminum alloy plate 13a.

The electrode 6 is thus capable of welding workpieces with high welding quality, has a long service life, can be used to successively weld workpieces an increased number of times.

Figure 13:
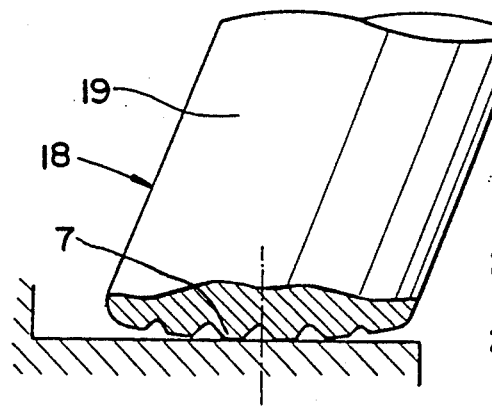
FIGS. 13 through 15 are views showing modified configurations for the electrode for resistance welding according to the present invention.
Figure 14:
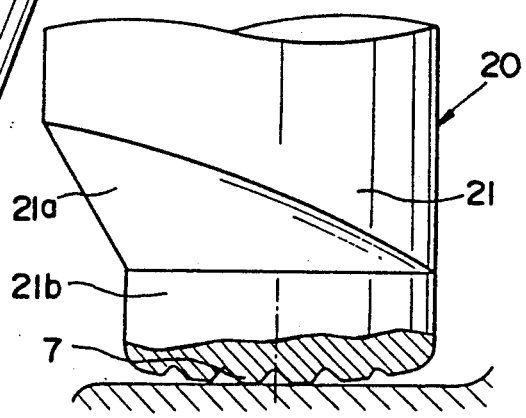
Figure 15:
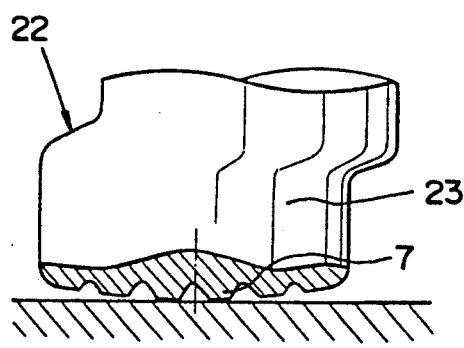

In the above embodiment, the electrode 6 is of a cylindrical shape. However, the electrode according to the present invention may be of various configurations. FIGS. 13 through 15 show electrodes of different shapes by way of example.

FIG. 13 shows an electrode 18 including an inclined electrode body 19 having teeth 7 on its tip end which are identical to those of the electrode 6 shown in FIGS. 4 and 5.

FIG. 14 shows an electrode 20 including an electrode body 21 composed of a larger-diameter portion 21a and a smaller-diameter portion 21b contiguous to the tip end of the larger-diameter portion 21a. The smaller-diameter portion 21b having teeth 7 on its tip end which are identical to those of the electrode 6 shown in FIGS. 4 and 5.

FIG. 15 shows an electrode 22 including a bent electrode body 23 having teeth 7 on its tip end which are identical to those of the electrode 6 shown in FIGS. 4 and 5.

The teeth 7 of the electrode 6 are arranged in a grid pattern. However, the teeth 7 of the electrode 6 may be arranged in a diagonal pattern. Each of the teeth 7 is not limited to the shape of a quadrangular or triangular pyramid, but may be of any tapered shape such as a conical shape, a frustoconical shape, or the like.

The electrode 6 is particularly effective when used to weld aluminum alloy plates, but may also be effectively used to weld other metal plates such as galvanized iron plates, SP steel plates, or the like.

The teeth 7 of the electrode 6 are not limited to a grid or diagonal pattern. They may be arranged in any of various patterns of characters or figures including a criss-cross pattern, an A-shaped pattern, an H-shaped pattern, a star-shaped pattern as shown in FIGS. 16(a) to 16(d). Alternatively, the teeth 7 may be arranged such that the recesses 8 between the teeth 7 may be arranged in any of various patterns of characters or figures including a criss-cross pattern, an A-shaped pattern, an H-shaped pattern, a star-shaped pattern as shown in FIGS. 16(a) to 16(h).

When electrodes with the teeth 7 arranged in the patterns shown in FIGS. 16(a) to 16(f) are used to weld workpieces, the workpiece are imprinted with welding marks having corresponding patterns. Such welding marks represent additional information, i.e., they can be used to determine the welding quality by checking if they are clearly imprinted or not, and can also be used to tell electrodes of one brand from electrodes of another brand.

The electrode 6 with its teeth 7 arranged in the A-shaped pattern as shown in FIG. 16(b), for example, may be used to resistance-weld the aluminum alloy plates 13 as shown in FIGS. 6 through 9. In the resistance welding process, the A-shaped pattern of the teeth 7 is imprinted on the aluminum alloy plate 13, forming an A-shaped welding mark 7x as shown in FIG. 16(i). The welding mark 7x has recesses corresponding to the teeth 7 of the electrode 6, and lands corresponding to the recesses 8 between the teeth 7. Since no teeth is present, but a recess is located, at the center of the electrode 6, a land is left in the welding mark 7x which corresponds to the center of the electrode 6. The aluminum alloy plate 13 may also have a welding mark that is imprinted with the teeth 7 arranged a criss-cross pattern, an H-shaped pattern, a star-shaped pattern.

The electrode 6 with the recesses 8 arranged in the A-shaped pattern as shown in FIG. 16(F) may be used to resistance-weld the aluminum alloy plates 13 as shown in FIGS. 6 through 9. In the resistance welding process, a welding mark 7y corresponding to the teeth 7 is imprinted on the aluminum alloy plate 13, forming an A-shaped mark M corresponding to the recesses 8 of the A-shaped pattern between strokes of the welding mark 7y as shown in FIG. 16(j). The welding mark 7y has recesses corresponding to the teeth 7 of the electrode 6, and lands corresponding to the recesses 8 between the teeth 7 (including the central recess 8a of the electrode 6). The aluminum alloy plate 13 may also have a welding mark that is imprinted with the recesses 8 arranged in a criss-cross pattern, an H-shaped pattern, a star-shaped pattern.

When the workpieces are welded using the electrode 6 whose teeth 7 or recesses 8 are arranged in the shape of a character or a figure, they are welded with high welding quality, and the workpiece is imprinted with a welding mark having a pattern corresponding to the character or the figure, giving additional information as described above.

A method of manufacturing an electrode for resistance welding according to an embodiment of the present invention will be described below with reference to FIGS. 17 through 21.

As shown in FIG. 17, two cylindrical electrode blanks 24 and a dresser tool 25 are employed in the method.

The electrode blanks 24 may be of any material that is generally used to make electrodes for resistance welding. For example, the electrode blanks 24 may be made of an alloy of chromium, zirconium, cadmium, beryllium, nickel, silicon, manganese, or iron, and copper. The electrode blanks 24 may be machined from the alloy material, or used electrodes may be employed as the electrode blanks 24.

The dresser tool 25 is made of a material harder than that of the electrode blanks 24, and has partly spherical concave grinding surfaces 26 of a predetermined radius of curvature on its opposite surfaces.

First, as shown in FIG. 17, the electrode blanks 24 are installed in confronting relationship to each other in a resistance welding machine (not shown), and the dresser tool 25 is interposed between the electrode blanks 24. The tip ends of the electrode blanks 24 are pressed against the respective grinding surfaces 26 of the dresser tool 25 under a pressure of 200 kgf, for example.

Figure 28:
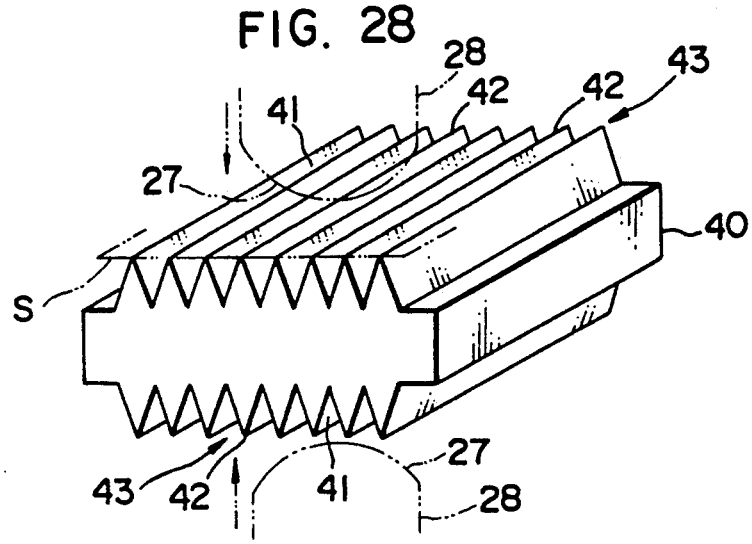
FIG. 28 is a respective view of a shaper jig for use in a method of manufacturing an electrode for resistance welding according to another embodiment of the present invention.

Then, the dresser tool 25 is rotated about the axis of the electrode blanks 24 to grind the tip ends thereof with the grinding surfaces 26. The tip ends of the electrode blanks 24 are ground to a shape complementary to the partly spherical concave shape of the grinding surfaces 26. As shown in FIG. 28, the electrode blanks 24 are now ground into provisional electrodes 28 having partly spherical convex surfaces 27 on their tip ends. Thereafter, the provisional electrodes 28 are moved away from each other, and the dresser tool 25 is removed from between the provisional electrodes 28.

Figure 21:
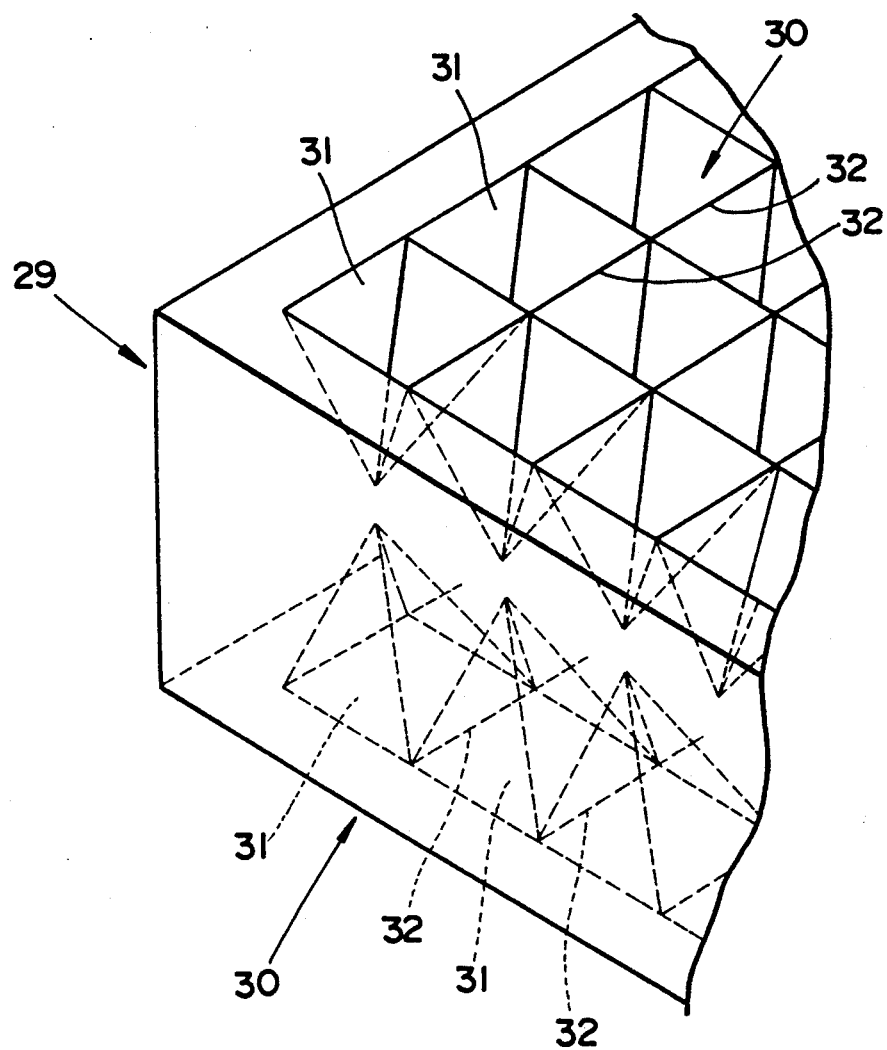
FIG. 21 is a fragmentary perspective view of a shaper jig used in the method shown in FIGS. 17 through 20.

Then, a shaper jig 29 shown in FIGS. 19 and 21 is employed to shape the provisional electrodes 28. More specifically, the shaper jig 29 comprises a flat metal plate harder than the provisional electrodes 28 and having toothed pressing surfaces 30 on its opposite sides. More specifically, as shown in FIG. 21, each side of the shaper jig 29 has a matrix of tapered recesses 31 each in the shape of a quadrangular pyramid which are arranged in a grid pattern, and a matrix of tapered teeth 32 each disposed between adjacent ones of the recesses 31.

As shown in FIG. 19, a hypothetical plane S joining the tips of the teeth 32 is a flat plane, and the recesses 31 has an equal depth from the hypothetical plane S.

The shaper jig 29 is interposed between the provisional electrodes 28, with the pressing surfaces 30 confronting the respective provisional electrodes 28. At this time, the hypothetical plane S lies perpendicularly to the axis of the provisional electrodes 28, and central teeth 32 of the pressing surfaces 30 are positioned on the axis of the provisional electrodes 28.

The surfaces 27 of the provisional electrodes 28 are then pressed against the pressing surfaces 30 of the shaper jig 29 under high pressure.

As shown in FIG. 21, the teeth 32 of each of the pressing surfaces 30 bite into the surface 27 of one of the provisional electrode 28, forming recesses 33 in the surface 27, with teeth 34 each in the shape of a quadrangular pyramid being formed between the recesses 33 at the respective recesses 31, thus producing a desired electrode 35. The electrode 35 thus manufactured is basically of the same configuration as the electrode 1 shown in FIGS. 1 and 2. The teeth 34 are arranged in a grid pattern corresponding to the pattern of the recesses 31 of the shaper jig 29. A recess 33a is formed at the center of the electrode 35. A hypothetical plane P joining the tips of the teeth 34 is a partly spherical convex plane containing the surface 27. Those teeth 34 which are closer to the center of the electrode 35 are higher and more sharply pointed than other teeth 34.

The above manufacturing method is capable of easily producing the electrode 35 with the teeth 34. The electrode 35 may be manufactured from a used electrode which is employed as the electrode blank 24, so that an electrode 35 which is degraded by repeated use can easily be reconstructed.

In the embodiment shown in FIGS. 17 through 21, when the electrodes 35 are produced from the provisional electrodes 28, the recesses 31 in each of the pressing surfaces 30 of the shaper jig 29 are of an equal depth and are arranged in a grid pattern. However, other shaper jigs having pressing surfaces 30 as shown in FIGS. 22 through 27 may be employed depending on the shape of teeth of an electrode to be manufactured.

Figure 22:
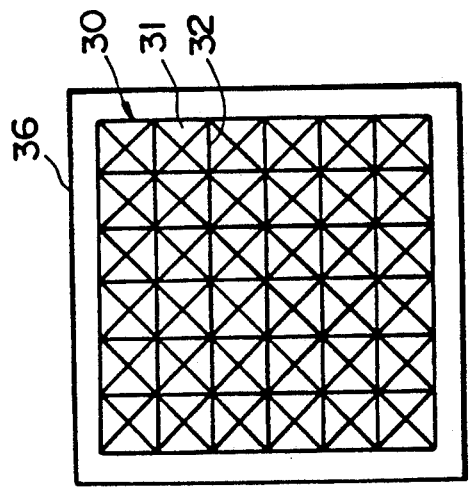
FIGS. 22 and 23 are plan and side elevational views, respectively, of another shaper jig that can be used in the method shown in FIGS. 17 through 20.
Figure 23:
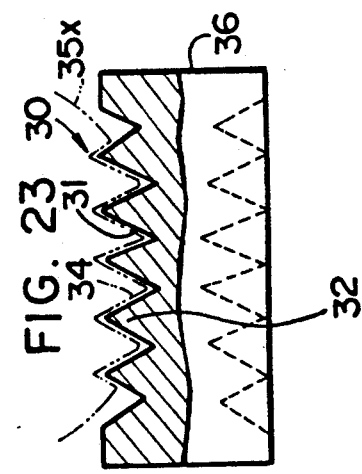

FIGS. 22 and 23 show another shaper jig 36 having recesses 31 and teeth 32, each in the shape of a quadrangular pyramid, arranged in a grip pattern on both pressing surfaces 30. Those recesses 31 which are closer to the center of the shaper jig 36 are progressively deeper. An electrode 35x, shown by the phantom lines in FIG. 23, produced from the provisional electrode 28 when it is pressed by the shaper jig 36, has its teeth 34 arranged in a grip pattern on the tip end of the electrode 35x, with those teeth 34 which are closer to the center of the electrode 35x being higher than those of the electrode 35.

Figure 24:
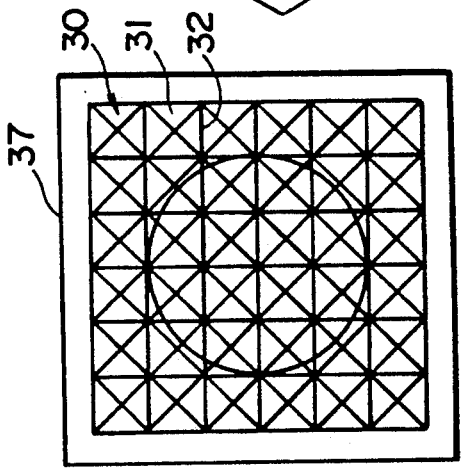
FIGS. 24 and 25 are plan and side elevational views, respectively, of still another shaper jig that can be used in the method shown in FIGS. 17 through 20.
Figure 25:
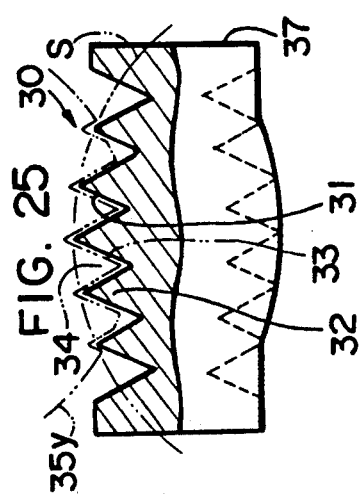

FIGS. 24 and 25 show still another shaper jig 37 having recesses 31 and teeth 32, each in the shape of a quadrangular pyramid, arranged in a grip pattern on both pressing surfaces 30. A hypothetical plane S joining the tips of the teeth 32 is a partly spherical convex plane having a relatively large radius of curvature, and the recesses 31 have an equal depth from the hypothetical plane S. An electrode 35y, shown by the phantom lines in FIG. 25, produced from the provisional electrode 28 when it is pressed by the shaper jig 37, has its teeth 34 arranged in a grip pattern on the tip end of the electrode 35y, with those teeth 34 which are closer to the center of the electrode 35y being higher than those of the electrode 35. A hypothetical plane (not illustrated) joining the bottoms of recesses 33 between the teeth 34 of the electrode 35y is a partly spherical concave plane complementary to the hypothetical plane S of the pressing surface 30.

Figure 26:
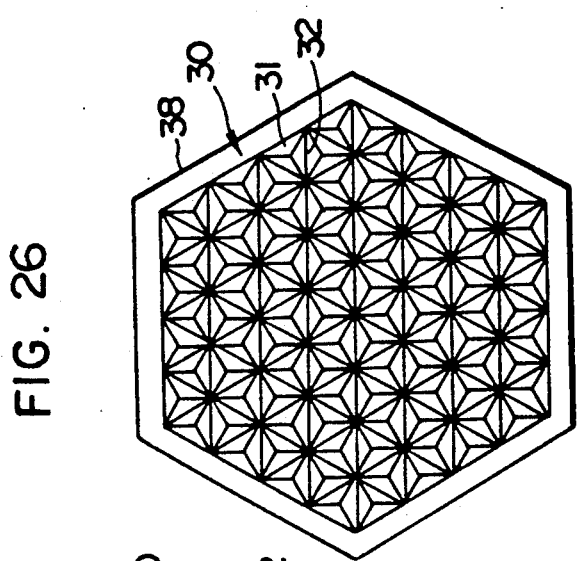
FIGS. 26 and 27 are plan and side elevational views, respectively, of yet another shaper jig that can be used in the method shown in FIGS. 17 through 20.
Figure 27:
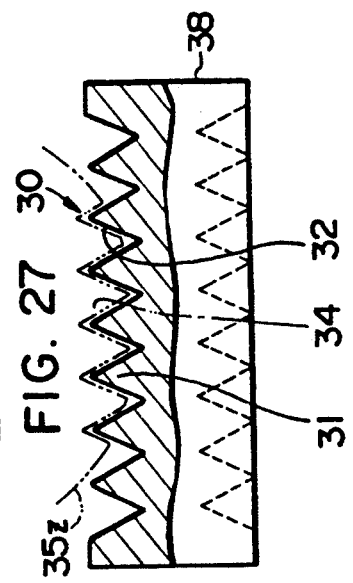

FIGS. 26 and 27 show yet another shaper jig 38 having recesses 31 and teeth 32, each in the shape of a triangular pyramid, arranged in a diagonal pattern on both pressing surfaces 30. An electrode 35z, shown by the phantom lines in FIG. 27, produced from the provisional electrode 28 when it is pressed by the shaper jig 38, has its teeth 34, each in the shape of a triangular pyramid, arranged in a diagonal pattern. The electrode 35z is basically of the same configuration as that of the electrode 1 shown in FIGS. 1 and 2.

Figure 29:
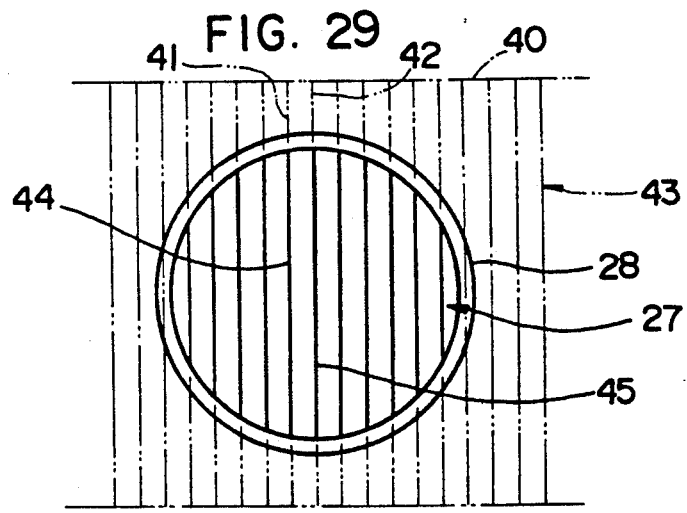
FIGS. 29 and 30 are views illustrative of a process for manufacturing an electrode using the shaper jig shown in FIG. 28.
Figure 30:
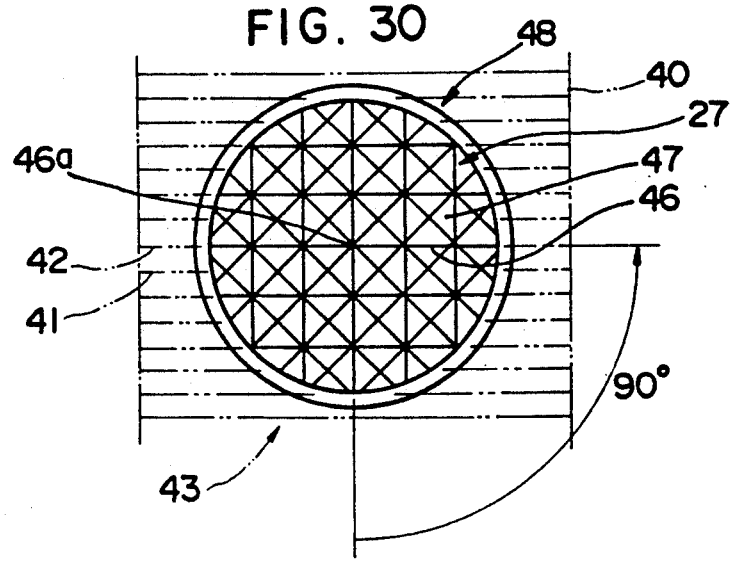

FIGS. 28 through 30 show a method of manufacturing an electrode for resistance welding according to another embodiment of the present invention.

According to this method, the provisional electrodes 28 having partly spherical convex surfaces 27 are first produced from the electrode blanks 24 as shown in FIGS. 17 and 18.

A shaper jig 40 as shown in FIG. 28 is employed to shape the provisional electrodes 28. More specifically, the shaper jig 40 comprises a metal plate with a plurality of grooves 41 of V-shaped cross section being defined in each of its opposite surfaces, the grooves 41 being arranged in a stripe pattern. A ridge 42 of inverted V-shaped cross section is formed between adjacent two of the grooves 41 on each surface of the shaper jig 40. These grooves 41 and ridges 42 jointly make up a toothed pressing surface 43 on each side of the shaper jig 40. The tips of the ridges 42 are joined by a flat hypothetical plane S, and the grooves 41 are of an equal depth from the hypothetical plane S.

As shown in FIG. 28, the provisional electrodes 28 are disposed in confronting relationship to each other, and the shaper jig 40 is interposed therebetween. At this time, central ridges 42 of the shaper jig 40 are positioned in alignment with the respective centers of the provisional electrodes 28. The hypothetical plane S lines perpendicularly to the axis of the provisional electrodes 28.

Then, the surfaces 27 of the provisional electrodes 28 are pressed against the pressing surfaces 43 of the shaper jig 40. As shown in FIG. 29, parallel ridges 44 and grooves 45 are formed in a stripe pattern on each of the surfaces 27 of the provisional electrodes 28, in complementary relationship to the grooves 41 and the ridges 42 of the pressing surfaces 43 of the shaper jig 40.

Then, as shown in FIG. 30, the shaper jig 40 is turned 90° around the axis of the provisional electrodes 28 until the grooves 41 and the ridges 42 of the pressing surfaces 43 of the shaper jig 40 extend perpendicularly to the ridges 44 and grooves 45 of the surfaces 27 of the provisional electrodes 28. Thereafter, the surfaces 27 of the provisional electrodes 28 are pressed against the pressing surfaces 43 of the shaper jig 40. At this time, those portions of the ridges 44 which are engaged by the ridges 42 are depressed by the ridges 42, producing recesses 46 in the surfaces 27, forming teeth 47, each in the shape of a triangular pyramid, arranged in a grid pattern. In this manner, a desired electrode 48 for resistance welding is produced. The electrode 48 is basically of the same shape as the electrode 6 shown in FIGS. 4 and 5. The teeth 47 of the electrode 48 are arranged in a grid pattern, with a recess 46a defined at the center of the electrode 48. The tips of the teeth 47 are joined by a partly spherical convex hypothetical plane (not shown) containing the surface 27. Those teeth 47 which are closer to the center of the electrode 48 are higher and more sharply pointed than other teeth 47.

Figure 31:
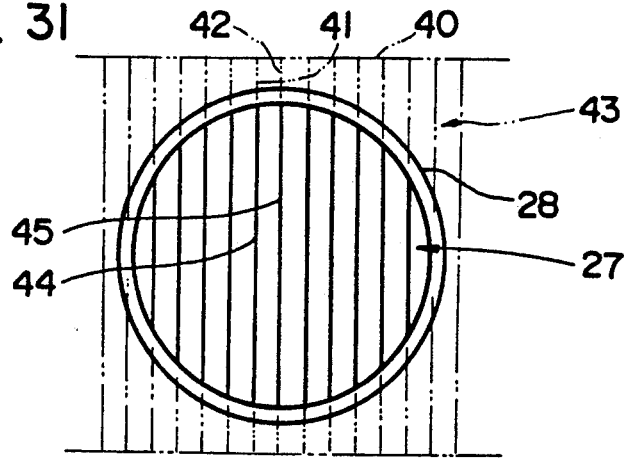
FIGS. 31 through 33 are views illustrative of another process for manufacturing an electrode using the shaper jig shown in FIG. 28.
Figure 32:
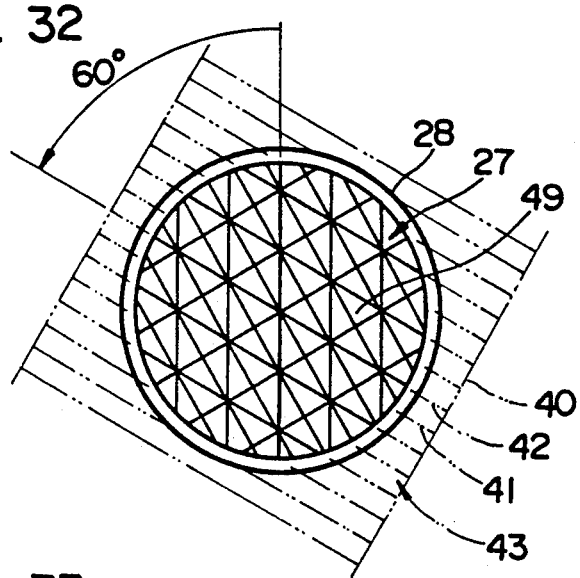
Figure 33:
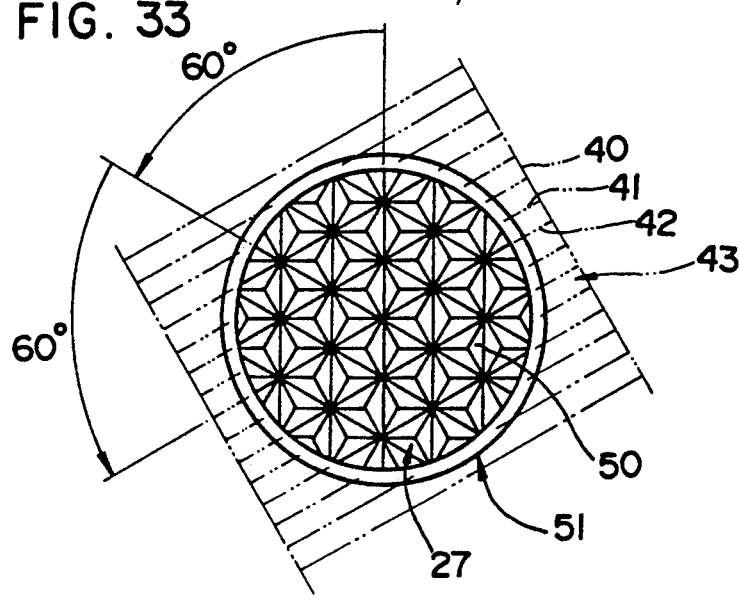

In the embodiment shown in FIGS. 28 through 30, the electrode 48 with the teeth 47, each in the shape of a quadrangular pyramid, arranged in a grid pattern on its tip end is produced using the shaper jig 40. However, an electrode with teeth, each in the shape of a triangular pyramid, arranged in a diagonal pattern may be produced using the shaper jig 40. FIGS. 31 through 33 show a method of manufacturing such an electrode.

As shown in FIG. 31, parallel ridges 44 and grooves 45 are formed in a stripe pattern on each of the surfaces 27 of the provisional electrodes 28 by pressing the surfaces 27 against the pressing surfaces 43 of the shaper jig 40.

Then, as shown in FIG. 32, the shaper jig 40 is turned 60° around the axis of the provisional electrodes 28. Thereafter, the surfaces 27 are pressed against the pressing surfaces 43 of the shaper jig 40, forming teeth 49, each in the shape of a quadrangular pyramid with its bottom shaped as a parallelogram, on the surfaces 27 of the provisional electrodes 28.

Then, as shown in FIG. 33, the shaper jig 40 is again turned 60° around the axis of the provisional electrodes 28, and thereafter, the surfaces 27 are pressed against the pressing surfaces 43 of the shaper jig 40. Now, teeth 50, each in the shape of a triangular pyramid, in a diagonal pattern on the surfaces 27 of the provisional electrodes 28. In this manner, a desired electrode 51 for resistance welding is manufactured. The electrode 51 thus produced is basically of the same configuration as that of the electrode 1 shown in FIG. 3.

FIGS. 34 through 38 show a method of manufacturing an electrode for resistance welding according to still another embodiment of the present invention.

Figure 34:
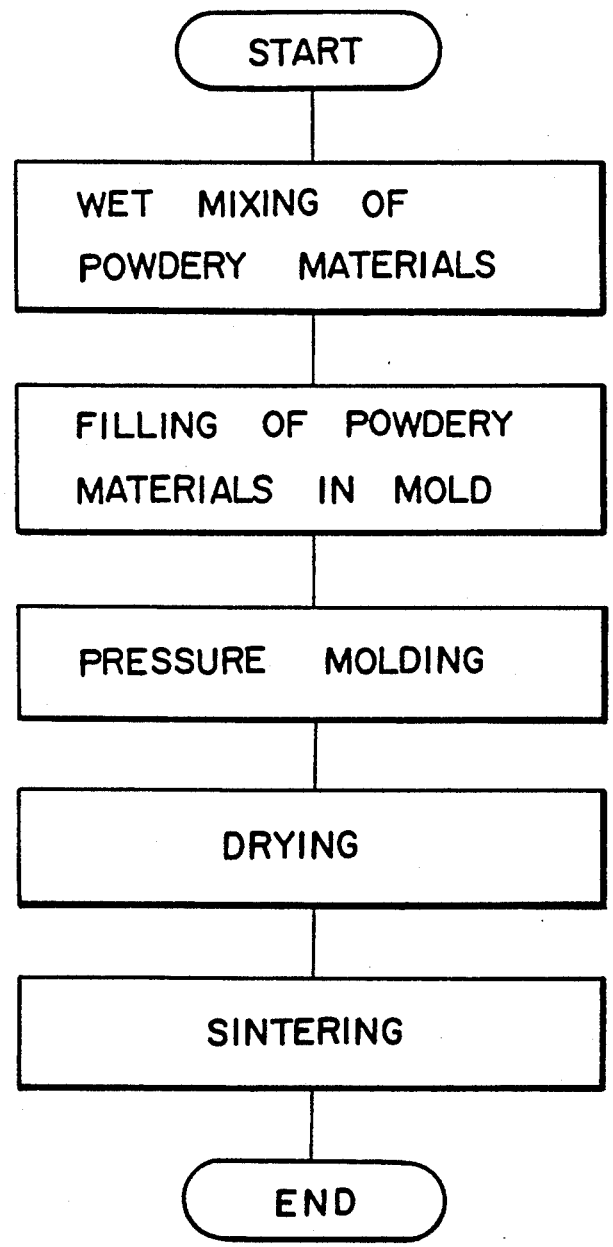
FIG. 34 is a flowchart of a method of manufacturing an electrode for resistance welding according to still another embodiment of the present invention.

According to this method, as shown in FIG. 34, a powdery mixed material for making an electrode blank is produced by mixing 97.5% by weight of a powder of electrolytic copper having an average particle diameter of 44 $\mu$m and 2.5% by weight of a powder of chromium having an average particle diameter of 1.6 $\mu$m. Then, the powdery mixture is mixed in a ball mill with a mixing solution of ethanol, thus dispersing the chromium powder uniformly in the electrolytic copper powder. Then, the mixture is adjusted such that 12 to 13% by weight of the powdery mixture is contained in the mixing solution of ethanol, after which the mixture is filled in a molding hole 54 defined in a mold 52 shown in FIG. 35.

The mold 52 comprises a mold body 53 with the molding hole 54 extending vertically therein, a lower punch 55 inserted in a lower portion of the molding hole 54, and an upper punch 56 inserted in an upper portion of the molding hole 54. The punches 55, 56 can be actuated by respective pressing devices (not shown) for vertical concentric movement in the molding hole 54.

The molding hole 54 has a diameter corresponding to the diameter of an electrode to be molded therein. In the illustrated embodiment, the molding hole 54 has a diameter of 22.6 mm. The upper punch 56 has a sliding presser 57 slidable in contact with the inner circumferential surface of the molding hole 54. The upper punch 56 also has a core punch 58 extending downwardly from the center of the bottom surface of the sliding presser 57. The lower punch 55 has a sliding presser 59 on its upper end portion which is slidable in contact with the inner circumferential surface of the molding hole 54, and a toothed molding surface 60 on the upper end of the sliding presser 59.

The molding surface 60 has a matrix of recesses 61 each having a cross-sectional shape of an inverted substantially quadrangular prismoid, with teeth 62 formed between the recesses 61. The recesses 61 are arranged in a grid pattern, and one of the teeth 62 is positioned at the center of the molding surface 60. The recesses 61 have respective bottom surfaces jointly making up a partly spherical concave hypothetical plane U whose radius of curvature is 150 mm. The tips of the teeth 62 are joined by a flat hypothetical plane S lying perpendicularly to the axis of the molding hole 54.

The recesses 61 are progressively deeper in the direction from the outer circumferential edge to the center of the molding surface 60. The deepest recess 61 is 0.8 mm deep from the hypothetical plane S. Each of the recesses 61 has two confronting slanted surfaces which are inclined at 90° to each other. The centers of adjacent recesses 61 are spaced 3.0 mm from each other.

With the lower pump 55 fixed in a predetermined position in the lower portion of the molding hole 54, the upper punch 56 is moved upwardly and removed from the molding hole 54. Then, the powdery mixture prepared in the manner described above is filled into the molding hole 54 from its upper end. Thereafter, the upper punch 56 is inserted downwardly into the molding hole 54. The upper and lower punches 56, 55 are pressed toward each other to press the filled powdery mixture under a predetermined hydrostatic pressure, thereby producing a molded provisional electrode 63.

The molded provisional electrode 63 has its tip end imprinted by the molding surface 60 of the lower punch 55, i.e., formed with provisional teeth 64 complementary to the recesses 61 and provisional recesses 65 complementary to the teeth 62. The molded provisional electrode 63 also has a provisional hole 66 formed by the core punch 58, which will be used as a coolant hole.

The molded provisional electrode 63 is then dried by being kept in an atmosphere at 80° C. for 6 hours, and then at 150° C. for 4 hours Thereafter, the molded provisional electrode 63 is sintered into an electrode for resistance welding in the manner described below.

In the presence of a nitrogen atmosphere flowing at a rate of 2 liters per minute, the temperature of the dried molded provisional electrode 63 in a furnace is increased at a rate of 10° C. per minute up to 350° C., and kept at 350° C. for one hour, and then increased at a rate of 10° C. per minute up to 485° C., and kept at 485° C. for one hour. In this sintering process, the surfaces of the chromium particles are covered with a protective film of ceramics containing nitrides. Therefore, the electrode has an increased mechanical strength. When the ceramics-reinforced electrode is pressed against workpieces for welding the latter, the electrode is less subjected to damage or wear, and is given a prolonged service life.

Furthermore, the temperature of the provisional electrode 63 is increased at a rate of 10° C. per minute up to 900° C., and kept at 900° C. for 30 minutes. Thereafter, in order to stabilize the protective film of ceramics, a nitrogen gas is introduced into the furnace until the pressure in the furnace becomes 5 bar. Then, the temperature of the provisional electrode 63 is increased at a rate of 100° C. per minute up to 980° C., and kept at 980° C. for 30 minutes, and then the temperature of the provisional electrode 63 is increased at a rate of 5° C. per minute up to 1030° C., and kept at 1030° C. for 30 minutes. Then, the temperature is increased at a rate of 5° C. per minute up to 1050° C., and kept at 1050° C. for 30 minutes.

Subsequently, the temperature is immediately dropped down to 1000° C., and then kept at 1000° C. for 4 hours. Then, the electrode is quenched by oil, and subjected to aging at 500° C. for 2 hours.

It was found that the sintered electrode thus produced by the above sintering process had a density of 8.92 g/cm$^3$, a hardness HRB of 78, and a tensile strength of 58 kgf/mm$^2$. The theoretical density of the sintered electrode was about 100%. An analysis of the sintered electrode indicated that it contained about 0.18% by weight of nitrogen.

The electrode thus produced according to the above manufacturing method will be described below with reference to FIGS. 36 through 38.

Figure 36:
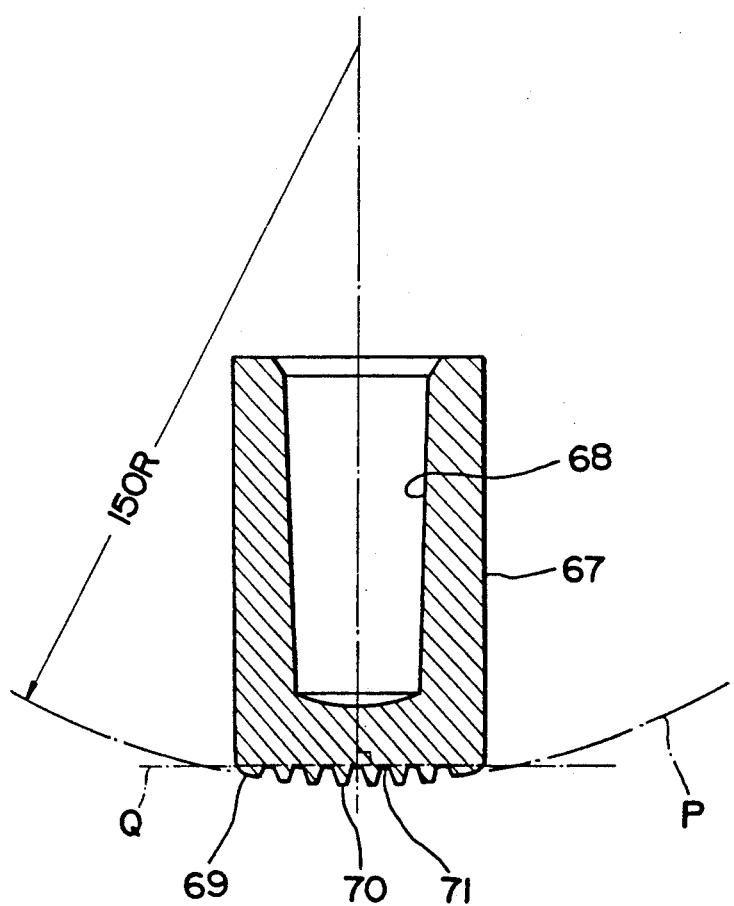
FIG. 36 is a vertical cross-sectional view of an electrode produced according to the method shown in FIG. 34.

As shown in FIG. 36, the electrode, generally designated by the reference numeral 67, has a central coolant hole 68 defined therein and opening at the upper end thereof. The electrode 67 has a pressing surface 69 on its lower end. The pressing surface 69 has a matrix of tapered teeth 70 with recesses 71 defined therebetween.

The tips of the teeth 70 jointly define or are joined by a partly spherical convex hypothetical plane P whose radius of curvature is 150 mm. The bottom surfaces of the recesses 71 are joined by a flat hypothetical plane Q lying perpendicularly to the axis of the electrode 67.

Figure 37:
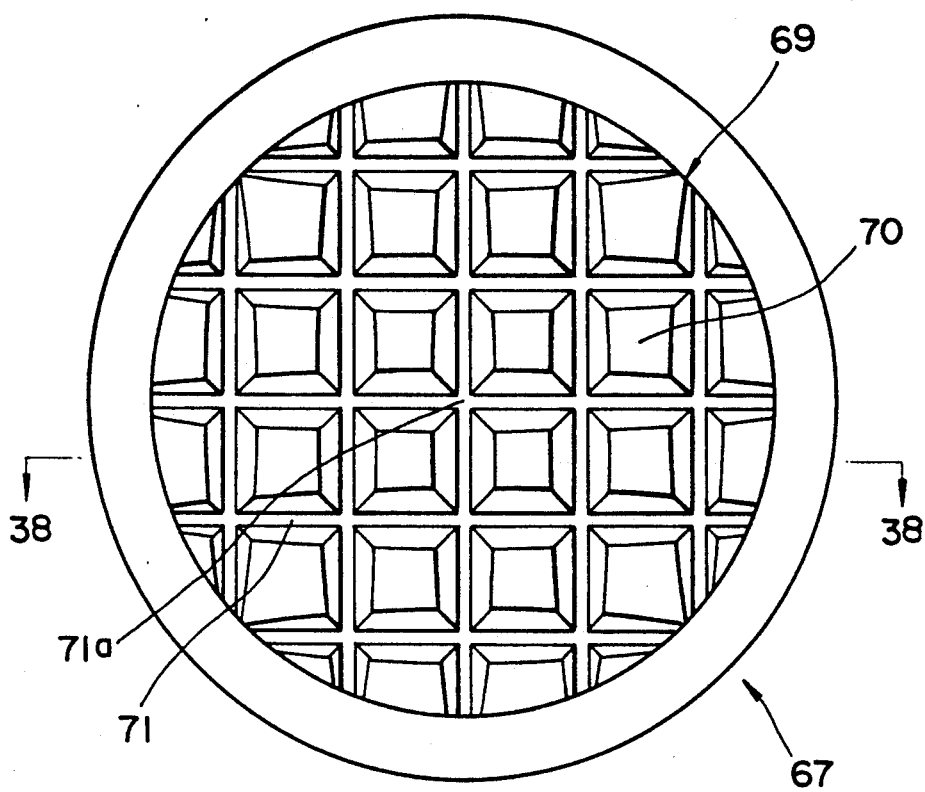
FIG. 37 is a plan view of a tip end of the electrode shown in FIG. 36.

As illustrated in FIG. 37, the teeth 70 are each in the shape of a quadrangular prismoid, and are arranged in a grid pattern except at the center of the pressing surface 69. A recess 71a is located at the center of the pressing surface 69. The recesses 71 jointly provide orthogonal grooves communicating with each other and have bottoms continuous to the outer circumferential edge of the pressing surface 69.

Figure 38:
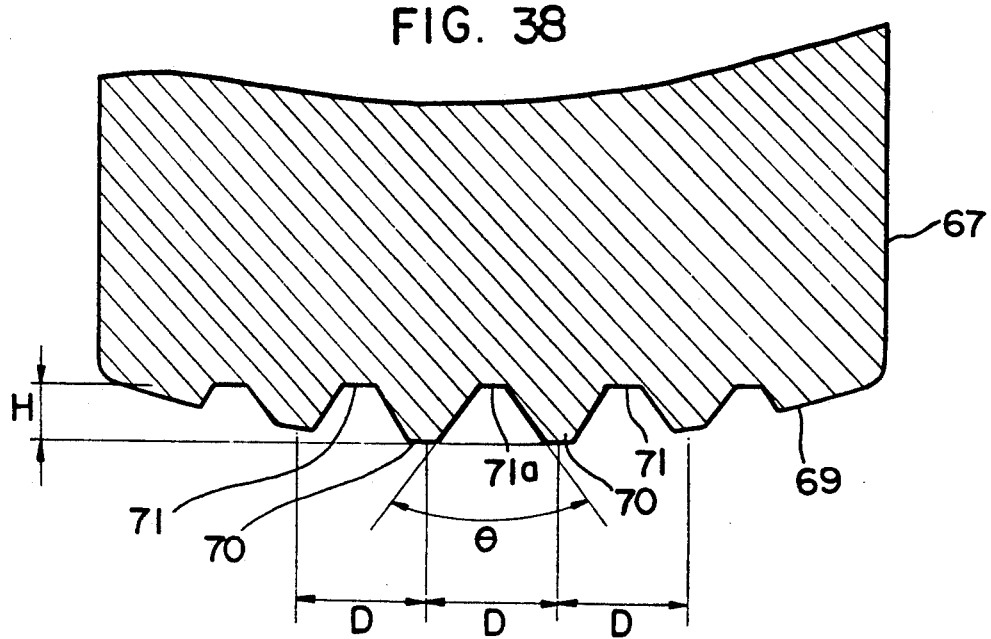
FIG. 38 is a cross-sectional view taken along line 38—38 of FIG. 37.

As shown in FIG. 38, those teeth 70 which are closer to the center of the pressing surface 69 are more sharply pointed, and have greater heights from the flat hypothetical plane Q.

This is because the hypothetical plane P joining the tips of the teeth 70 is a partly spherical plane whose radius of curvature is 150 mm, the tallest tooth 70 having a height H of 0.8 mm. The two slanted surfaces of adjacent teeth 70 which define a recess 71 therebetween form an angle of $\theta$ of 90° therebetween. The distance D between the centers of adjacent teeth 70 is 3.0 mm.

When the electrode 67 is used to weld workpieces, the concentration of loads, e.g., the welding pressure, the current, and the heat would be greater at the center of the pressing surface 69. Since the teeth 70 are arranged on the pressing surface 69, however, such loads are reduced on the pressing surface 69, as can be understood from the aforesaid description of the electrodes 1, 6 shown in FIGS. 1, 2 and 4, 5.

In the illustrated embodiment, the pressing surface 69 on the tip end of the electrode 67 has 16 teeth 70.

According to the above manufacturing method, the powdery mixture is filled in the molding hole 54 in the mold 52 in which the lower punch 55 with the toothed molding surface 60 is fitted, and then molded under pressure into the molded provisional electrode 63. Therefore, the teeth 70 and the recesses 71 are directly formed from the powdery mixture. As a result, the teeth 70 have sufficiently smooth surfaces to reduce the deposition of materials produced when the electrode 67 and workpieces are fused together when the workpieces are resistance-welded using the electrode 67, and hence are not required to be additionally machined for smooth surfaces. The electrode 67 can be manufactured in a short period of time at a reduced cost.

A welding test was conducted on the electrode 67. In the welding test, aluminum alloy plates having thicknesses of 3.0 mm and 3.5 mm according to JIS-A5182 were superposed, and the electrode 67 and another electrode were vertically pressed against the superposed aluminum alloy plates disposed therebetween under a pressure of 1200 kgf. In the welding test, a DC welding current of 42 kA was supplied in a welding time of 0.3 sec., equivalent to 15 cycles out of 50 cycles per second, from the electrode 67 to the aluminum alloy plates to determine the number of times that the electrode 67 is used to successively weld the aluminum alloy plates.

The results of the welding test are given in Table 1 below, and referred to as Inventive Example 1 in Table 1. In Table 1, the term "successive welding count" represents the number of times that the electrode can be used to successively weld the aluminum alloy plates, while sufficiently effective nuggets are produced and the breaking strength of the welded region of the aluminum alloy plates is a minimum of 1300 kgf, and the term "effective successive welding count" represents the number of times that the electrode can be used to successively weld the aluminum alloy plates, until sparks are produced at the region where the electrode hits the aluminum alloy plates or a weld crack is produced. The greater the "successive welding count" and the "effective successive welding count", the longer the service life of the electrode.

In the embodiment shown in FIGS. 36 through 38, the teeth 70 on the pressing surface 69 of the electrode 67 are arranged in a grid pattern. Since the electrode 67 is produced by molding and sintering the powdery mixture, the teeth 70 may be arranged to represent characters or symbols as shown in FIGS. 16(a) to 16(h). To arrange the teeth 70 in such a character or symbol pattern, the teeth 62 on the molding surface 60 of the lower punch 55 in the mold 52 shown in FIG. 35 may be arranged in a character or symbol pattern.

Figure 39:
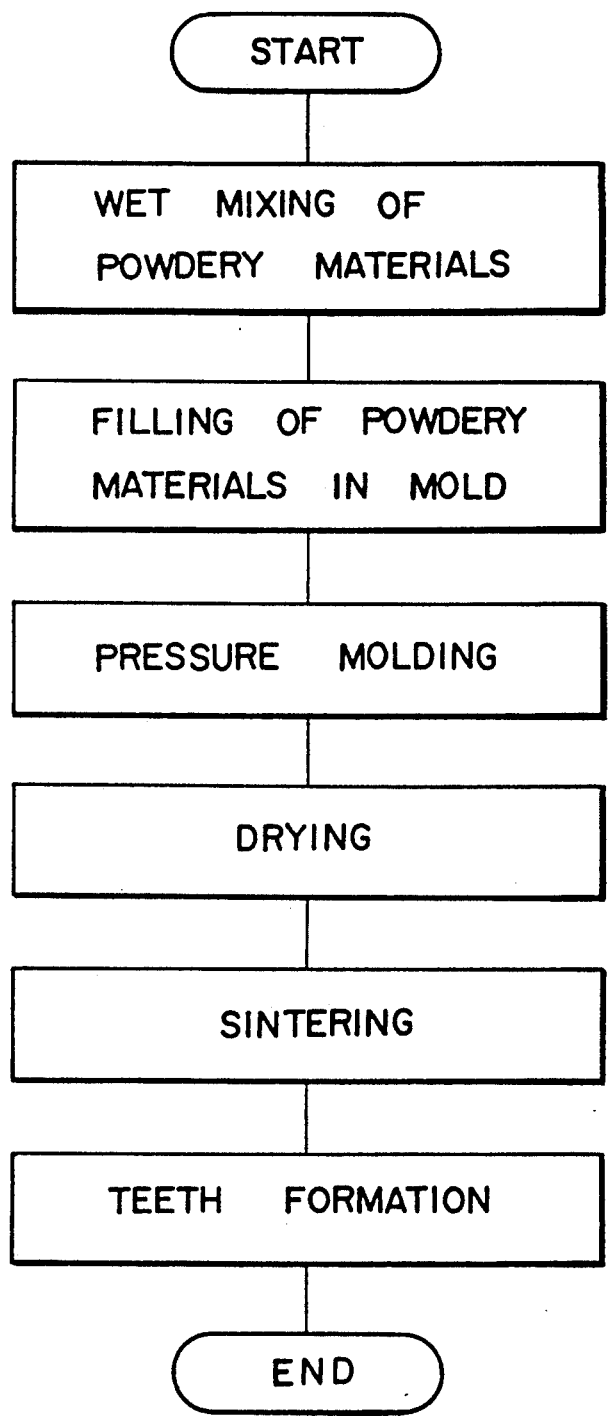
FIG. 39 is a flowchart of a method of manufacturing an electrode for resistance welding according to yet another embodiment of the present invention.
Figure 40:
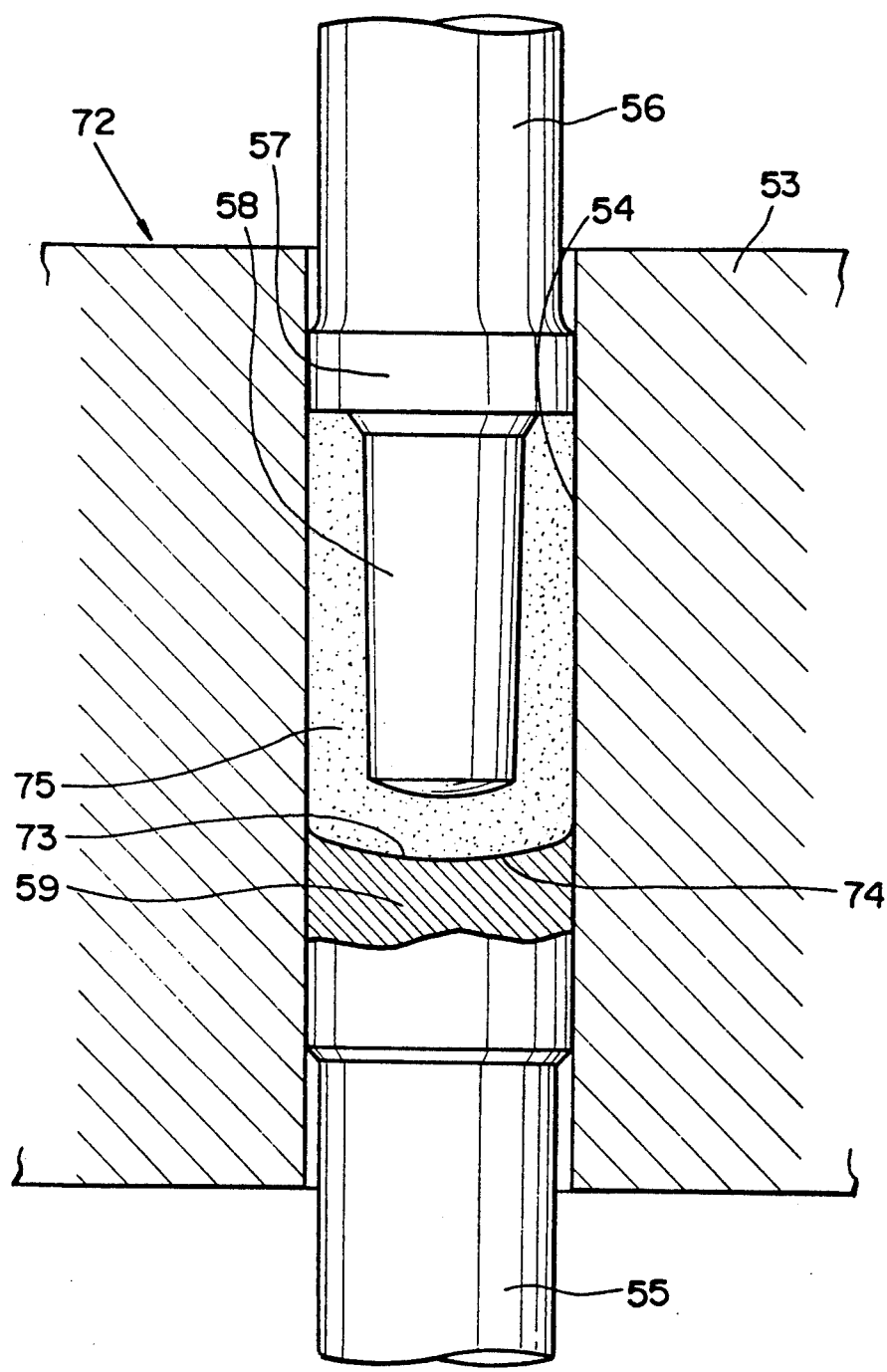
FIG. 40 is a vertical cross-sectional view showing a molding process of the method shown in FIG. 39.
Figure 41:
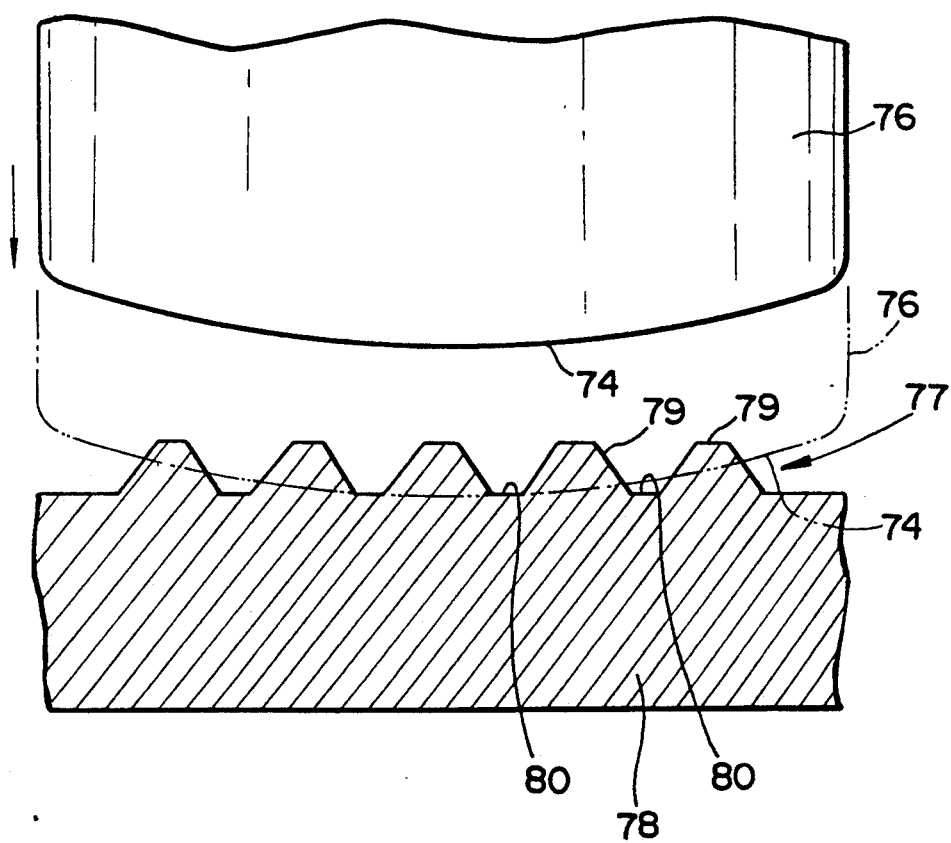
FIG. 41 is a vertical cross-sectional view showing a teeth forming process of the method shown in FIG. 39.

FIGS. 39 through 41 show a method of manufacturing an electrode for resistance welding according to yet another embodiment of the present invention.

According to this method, as shown in FIG. 39, a powdery mixed material for making an electrode blank is produced in the same manner as described with reference to FIG. 34. The powdery mixture is then molded under pressure with a mold 72 shown in FIG. 40. More specifically, the mold 72 is essentially of the same arrangement as the mold 52 shown in FIG. 35. More specifically, the mold 72 comprises a mold body 53 with the molding hole 54 extending vertically therein, a lower punch 55 inserted in a lower portion of the molding hole 54, and an upper punch 56 inserted in an upper portion of the molding hole 54. The lower punch 55 has a partly spherical concave molding surface 73 on its upper end which has a center on the axis of the molding hole 54, the molding surface 73 having a radius of curvature of 150 mm. The mold 72 is identical to the mold 52 except for the partly spherical concave molding surface 73 on the upper end of the lower punch 55.

The powdery mixture is filled in the molding hole 54 in the mold 72 between the punches 55, 56, and then the upper and lower punches 56, 55 are pressed toward each other to press the filled powdery mixture under a hydrostatic pressure of 150 MPa, thereby producing a molded provisional electrode 75, as shown in FIG. 40. The molded provisional electrode 75 has a partly spherical convex surface 74 on its tip end complementarily to the molding surface 73 of the lower punch 55. The molded provisional electrode 75 has a diameter of 22.6 mm and a length of 125 mm.

The molded provisional electrode 75 is then dried and sintered in the same manner as described above with reference to FIGS. 34 and 35, thus producing a sintered provisional electrode 76 as shown in FIG. 41. It was found in a test that the sintered provisional electrode 76 had a density of 8.92 g/cm$^3$, a hardness $H_{RB}$ of 78, and a tensile strength of 58 kgf/mm$^2$. The theoretical density of the sintered electrode was about 100%. The sintered provisional electrode 76 has a protective film of ceramics containing nitrides on the surfaces of the chromium particles, formed in the sintering process.

The sintered provisional electrode 76 thus produced is basically identical to the provisional electrodes 28 shown in FIG. 18.

The surface 74 of the sintered provisional electrode 76 is then pressed against a toothed pressing surface 77 of a shaper jig 78 of hard metal as shown in FIG. 41 by a 1000-ton mechanical press. The pressing surface 77 has teeth 79 and recesses 80 arranged in a grid pattern as with the shaper jig 29 shown in FIG. 21. The teeth 79 and the recesses 80 are of the same shape and spaced at the same interval as the teeth 62 and the recess 61 on the molding surface 60 of the lower punch 55 shown in FIG. 35. The teeth 79 and the recesses 80 are of the same size as that of the teeth 62 and the recess 61 which are closest to the center of the lower punch 55 shown in FIG. 35.

When the provisional electrode 76 and the shaper jig 78 are pressed against each other, teeth are formed on the surface 74 of the provisional electrode 76, thereby producing an electrode which is of the same configuration as the electrode 67 shown in FIGS. 36 through 38. To improve the sliding characteristics of the provisional electrode 76 and the shaper jig 78, the provisional electrode 76 is coated with molybdenum disulfide.

According to the manufacturing method shown in FIGS. 39 through 41, the molded provisional electrode 75 with the partly spherical convex surface 74 on its tip end is directly produced when the powdery mixture is molded under pressure in the mold 52. When the molded provisional electrode 75 is sintered into the sintered provisional electrode 75 and the shaper jig 78 is pressed against the surface 74 of the sintered provisional electrode 75, the same electrode as the electrode 67 shown in FIGS. 36 through 38 is manufactured. The tips of the teeth of the electrode thus produced have sufficiently smooth surfaces to reduce the deposition of materials produced when the electrode and workpieces are fused together when the workpieces are resistance-welded using the electrode, and hence are not required to be additionally machined for smooth surfaces. The electrode can be manufactured in a short period of time at a reduced cost.

A welding test was conducted on the electrode manufactured according to the method shown in FIGS. 39 through 41, under the same conditions as those in the welding test conducted on the electrode 67 shown in FIGS. 36 through 38. The results of the welding test are given in Table 1 below, and referred to as Inventive Example 2 in Table 1. Table 1 shows the "successive welding count" and the "effective successive welding count" with respect to Inventive Example 2.

An electrode (not shown) for resistance welding was manufactured from a commercially available electrode blank of chromium-copper alloy, the electrode having a partly spherical convex surface on its tip end with no teeth. This electrode was subjected to a welding test under the same conditions as those of the above welding tests except that the electrode was pressed against the workpieces under 1600 kgf and a DC welding current of 46 kA was supplied. The results of the welding test are given in Table 1 below, and referred to as Comparative Example 1 in Table 1. The pressure and the welding current for Comparative Example 1 were larger than those of Inventive Examples 1 and 2 because the electrode with no teeth was considered ineffective to break the oxide film of the workpiece. Table 1 shows the "successive welding count" and the "effective successive welding count" with respect to Comparative Example 1.

TABLE 1

|  | Pressure (kgf) | Current (kA) | Welding time (cycles) | A | B |
| --- | --- | --- | --- | --- | --- |
| Inventive Example 1 | 1200 | 42 | 15 | 900 | 800 |
| Inventive Example 2 | 1200 | 42 | 15 | 850 | 730 |
| Comparative | 1600 | 46 | 15 | 100 | 40 |

TABLE 1-continued

| | Pressure (kgf) | Current (kA) | Welding time (cycles) | A | B |
|---|---|---|---|---|---|
| Example 1 | | | | | |

A: Successive welding count
B: Effective successive welding count

As can be seen from Table 1, the electrodes according to Inventive Examples 1 and 2 have much higher successive welding counts and effective successive welding counts than those of the electrode according to Comparative Example 1, and hence have much longer service lives. It appears that the teeth 70 of the electrode 67 are effective to prevent fused materials from being attached to the electrode 67 and to produce good nuggets. The successive welding counts and effective successive welding counts of the electrodes according to Inventive Examples 1 and 2 are substantially the same as each other, but the electrode according to Inventive Example 1 has a slightly longer service life than the electrode according to Inventive Example 2. This is because the teeth of the electrode according to Inventive Example 1 have smoother surfaces and are more homogeneous than the teeth of the electrode according to Inventive Example 2.

A resistance welding method according to an embodiment of the present invention will be described below with reference to FIGS. 42 through 54.

Figure 42:
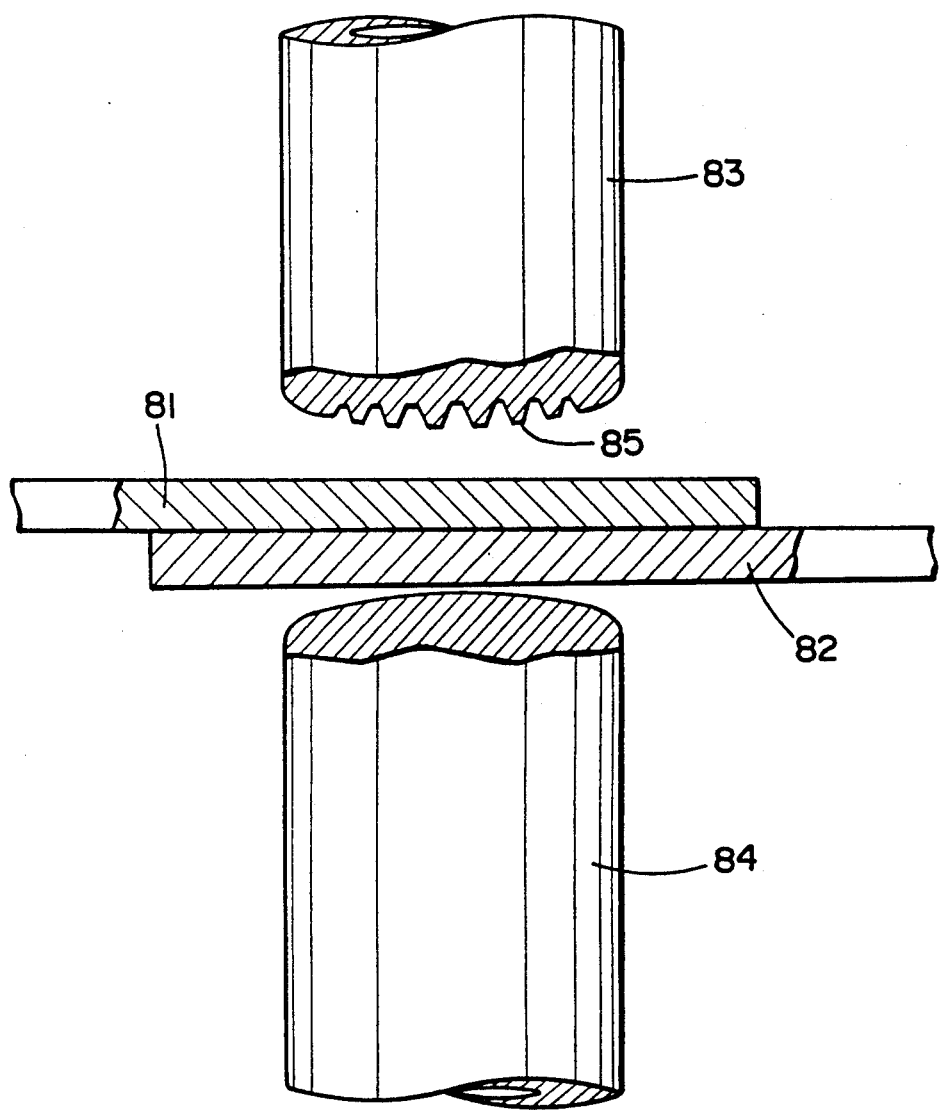
FIG. 42 is a side elevational view, partly in cross section, showing a resistance welding method according to an embodiment of the present invention.

As shown in FIG. 42, a welding test was conducted in which aluminum alloy plates 81, 82 having respective thicknesses of 3.0 mm and 3.5 mm according to JIS-A5182 were superposed, and electrodes 83, 84 were vertically pressed against the superposed aluminum alloy plates 81, 82 disposed therebetween under a pressure of 1200 kgf. In the welding test, a DC welding current of 42 kA was supplied in a welding time of 15 cycles.

The electrode 83 has a matrix of teeth 85 on its tip end, and the electrode 84 has a smooth partly spherical convex surface on its tip end. The electrodes 83, 84 are used as positive and negative electrodes, respectively.

Figure 35:
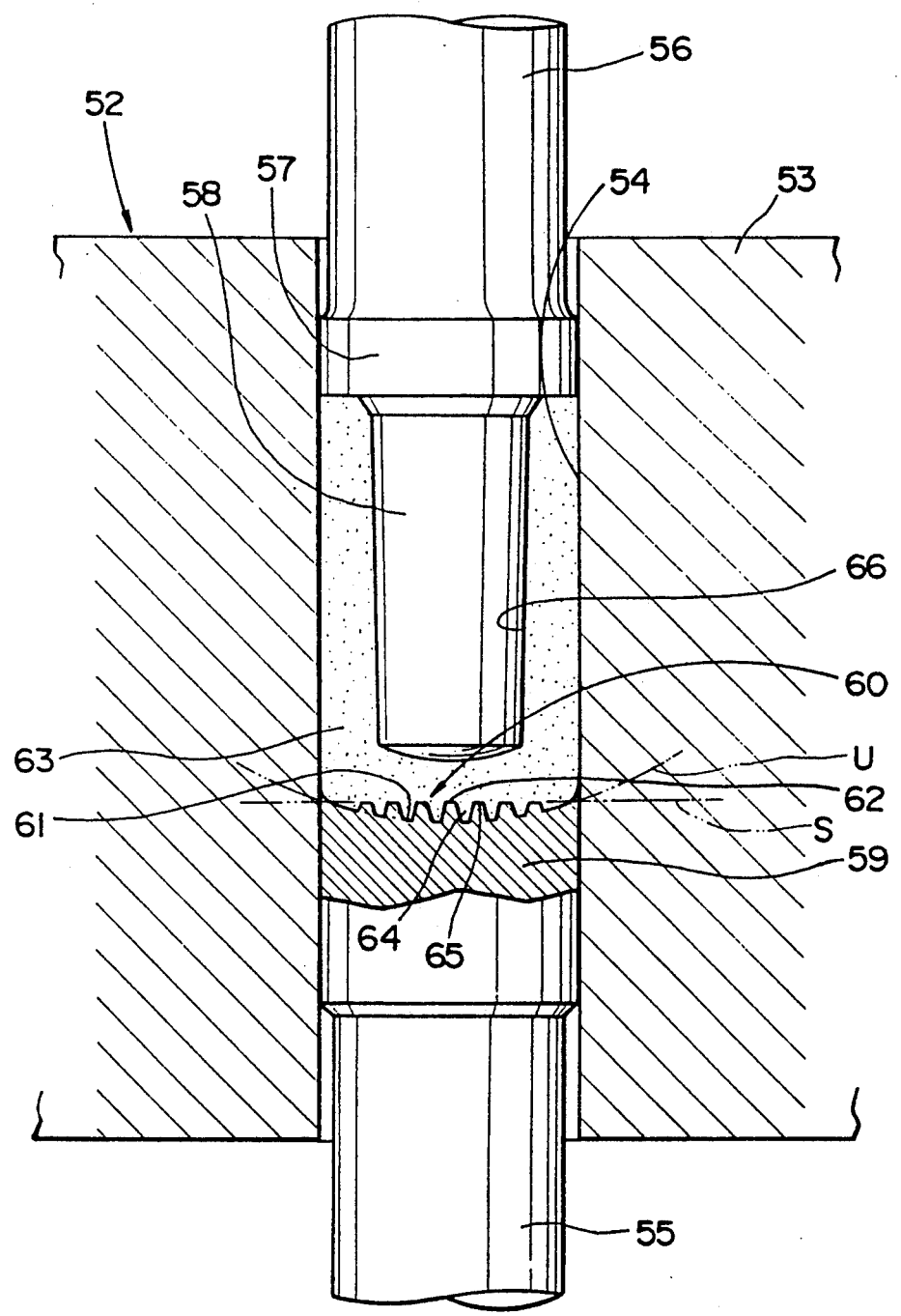
FIG. 35 is a vertical cross-sectional view showing a molding process of the method shown in FIG. 34.
Figure 45:
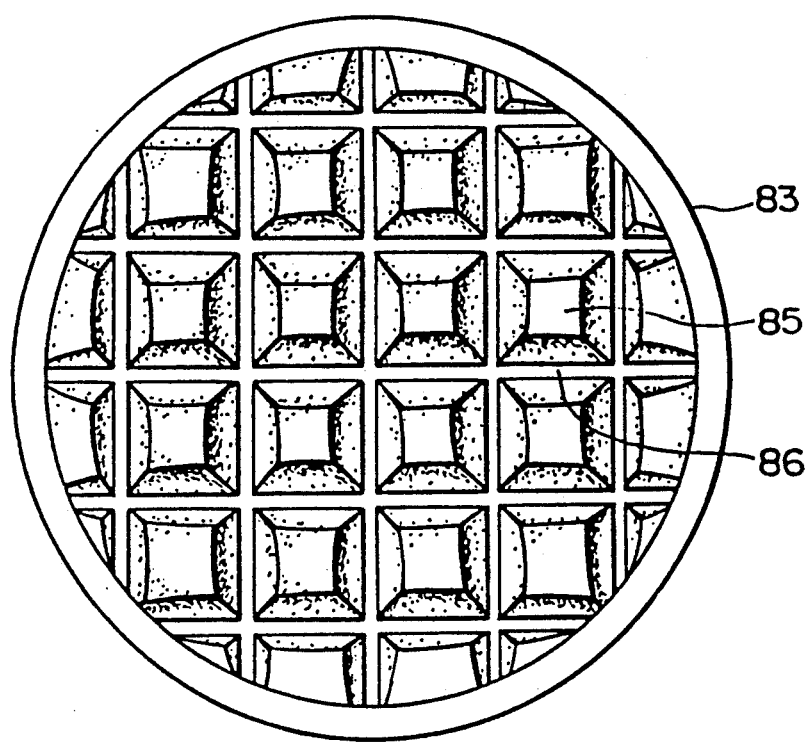
FIGS. 45 through 48 are plan views illustrative of the manner in which the tip end of the positive electrode shown in FIG. 43 varies during usage.
Figure 46:
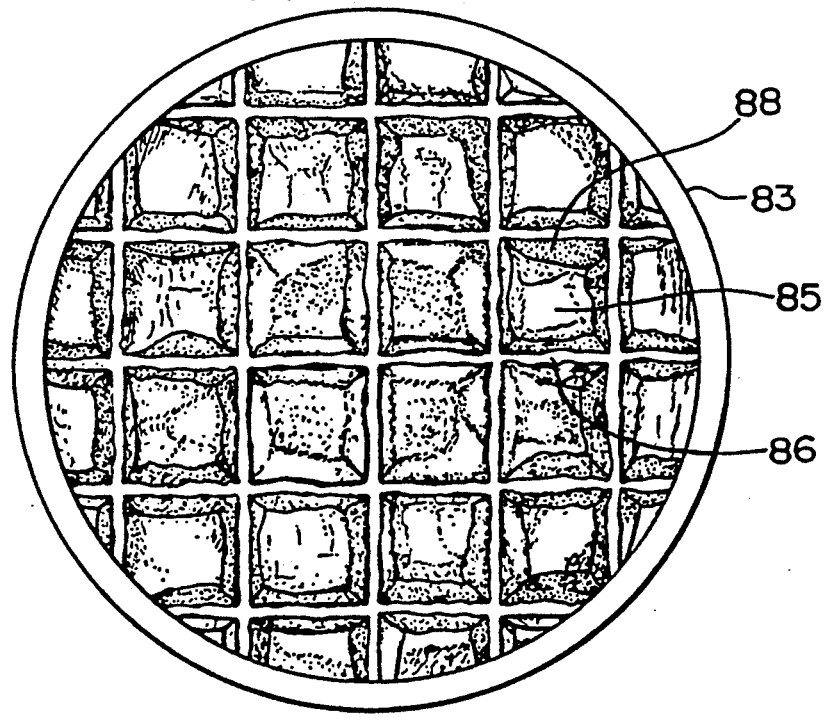

The electrode 83 is manufactured by molding a powdery mixture under pressure and sintering a molded provisional electrode according to the method described with reference to FIGS. 34 and 35. The teeth 85 of the electrode 83 are each in the shape of a quadrangular pyramid, and are arranged in a grid pattern, as shown in FIG. 45.

Figure 43:
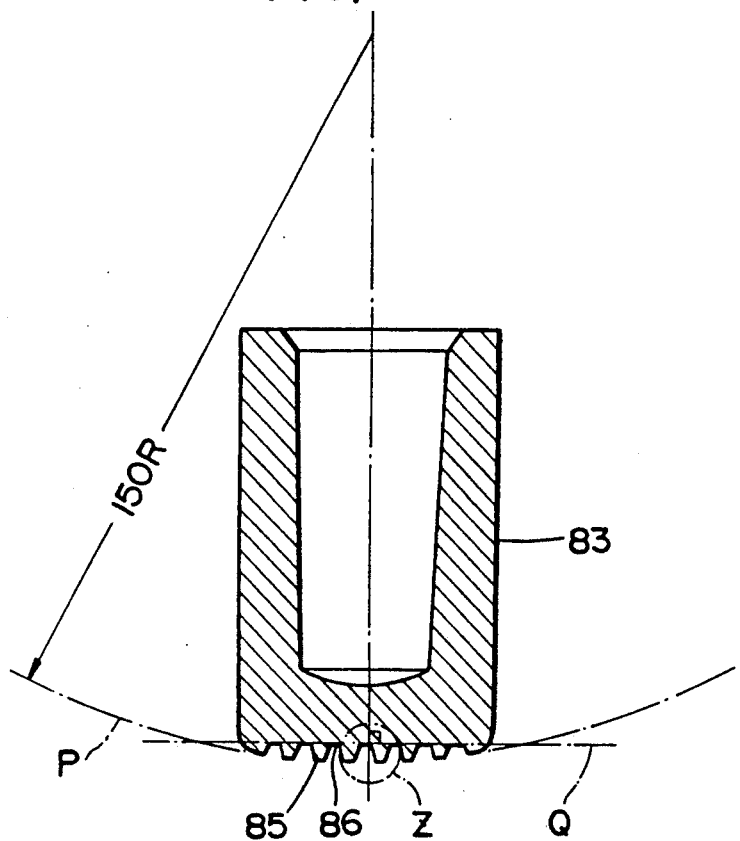
FIG. 43 is a vertical cross-sectional view of a positive electrode used in the resistance welding method shown in FIG. 42.

More specifically, as shown in FIG. 43, a hypothetical plane P joining the tips of the teeth 85 is a partly spherical convex plane whose center of curvature is 150 mm, and a hypothetical plane Q joining the bottoms of recesses 86 between adjacent ones of the teeth 85 is a flat plane lying perpendicularly to the central axis of the electrode 83. Therefore, the height of the teeth 85 from the hypothetical plane Q is progressively greater from the outer circumferential surface to the center of the electrode 83. A recess 86a is present at the center of the tip end of the electrode 83.

Figure 44:
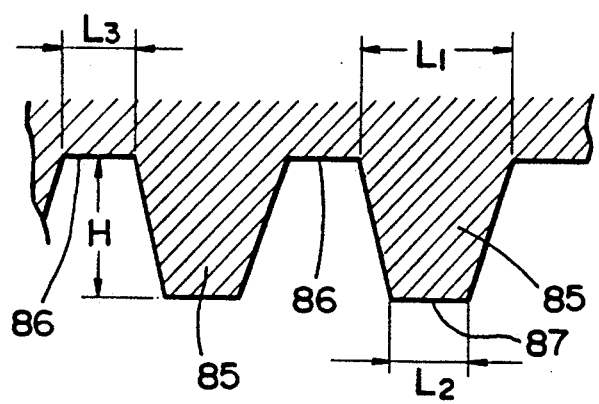
FIG. 44 is an enlarged fragmentary cross-sectional view of an encircled area Z in FIG. 43.

As shown in FIG. 44, each of the teeth 85 has a bottom having a width $L_1$ of 2 mm. The teeth 86 closest to the center of the electrode 83 have tip ends each having a width $L_2$ of 1 mm. Each recess 86 has a width $L_3$ of 1 mm.

The teeth 85 closest to the center of the electrode 83 have a height H of 1 mm. Since the hypothetical Plane P joining the tips of the teeth 85 is a partly spherical convex plane having a radius of curvature of 150 mm, as described above, the teeth 85 near the outer circumferential edge of the tip end of the electrode 83 have a height H smaller than 1 mm.

The electrode 84 is basically the same as the provisional electrode 74 shown in FIG. 41, and hence is manufactured by molding a powdery mixture under pressure and sintering a molded provisional electrode. Therefore, the electrode 84 has no teeth on its tip end.

The results of the above welding test are given in Table 2 below, and referred to as Inventive Example 3 in Table 2. In Table 2, the term "successive welding count" represents the number of times that the electrode can be used to successively weld the aluminum alloy plates, while sufficiently effective nuggets are produced and the breaking strength of the welded region of the aluminum alloy plates is a minimum of 1300 kgf, and the term "effective successive welding count" represents the number of times that the electrode can be used to successively weld the aluminum alloy plates, until sparks are produced at the region where the electrode hits the aluminum alloy plates or a weld crack is produced. The greater the "successive welding count" and the "effective successive welding count", the longer the service life of the electrode.

FIGS. 45 through 52 show the tip ends of the electrodes 83, 84 as they vary during usage, the tip ends being observed at a magnification ratio of 7.5.

FIGS. 45 through 48 illustrate the conditions of the tip end of the positive electrode 83 after the successive welding count is 0 (not used), 300, 500, and 800, respectively. FIGS. 49 through 52 illustrate the conditions of the tip end of the negative electrode 84 after the successive welding count is 0 (not used), 300, 500, and 800, respectively.

Figure 47:
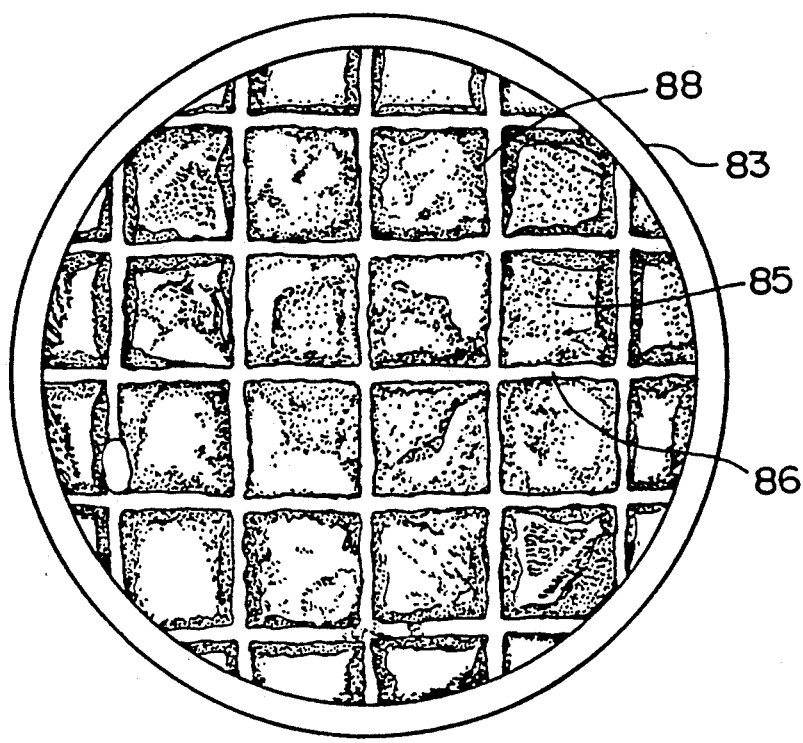
Figure 48:
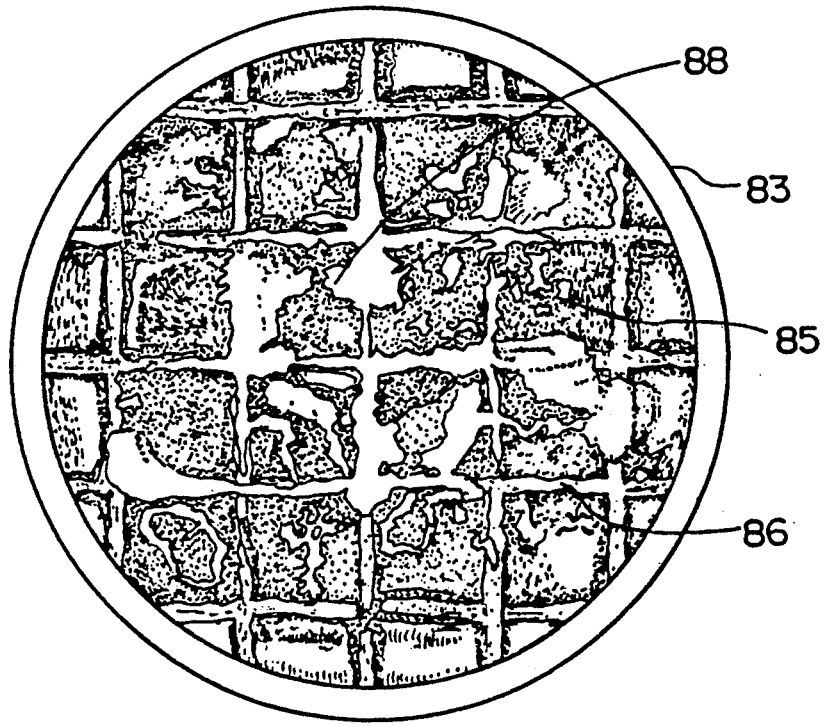
Figure 49:
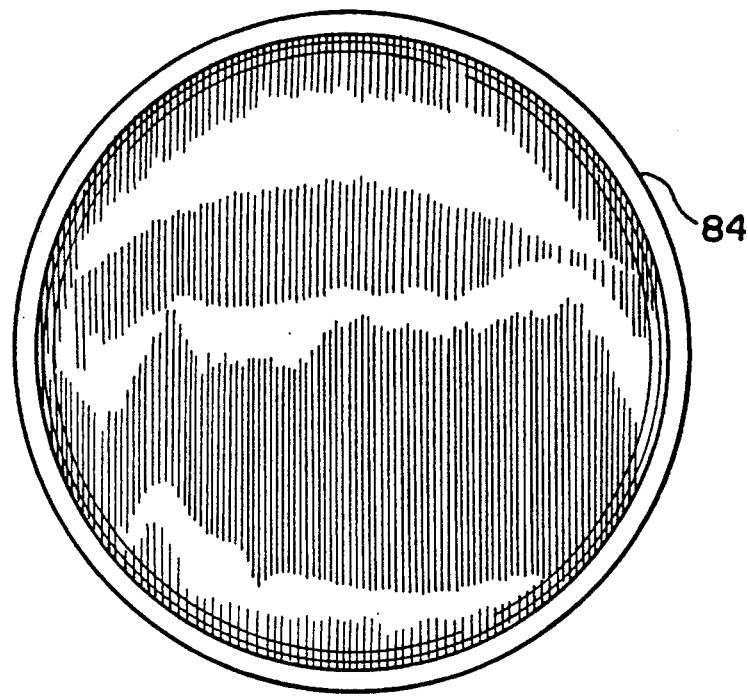
FIGS. 49 through 52 are plan views illustrative of the manner in which the tip end of a negative electrode used in the resistance welding method shown in FIG. 42 varies during usage.
Figure 50:
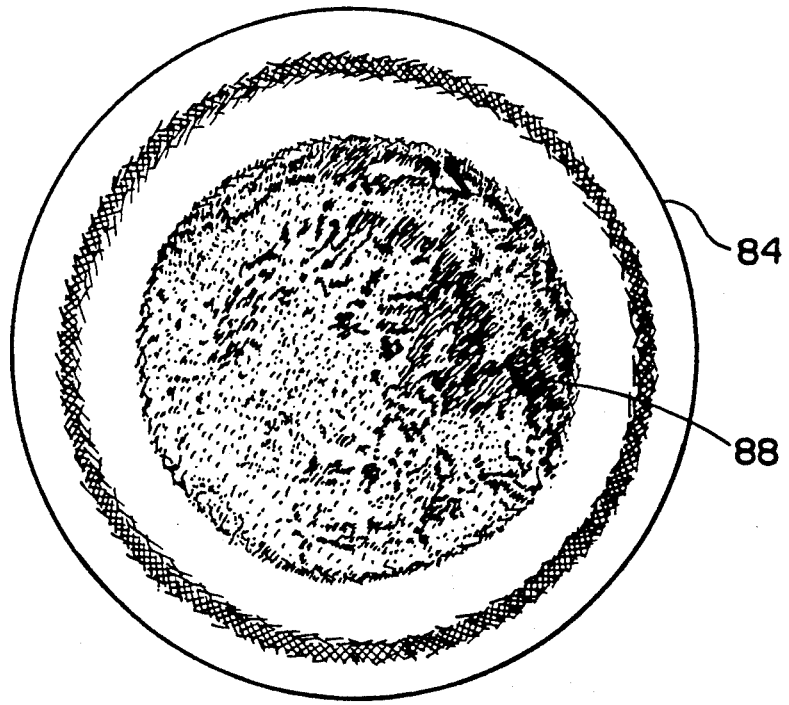

As shown in FIGS. 45 through 48, as the successive welding count increases, the teeth 85 of the electrode 85 are gradually damaged by fused deposits 88, and the recesses 86 are gradually filled with fused deposits 88, with the boundaries between the teeth 85 and the recesses 86 becoming progressively unclear. Comparison of FIGS. 47 and 48 indicates that the boundaries between the teeth 85 and the recesses 86 as shown in FIG. 47 after the successive welding count is 500 are clearer than the boundaries between the teeth 85 and the recesses 86 as shown in FIG. 48 after the successive welding count is 800. Therefore, at least until after the successive welding count is 500, the teeth 85 remain effective to prevent the welding current from concentrating in localized regions, to prevent fused materials from being attached to the electrode 83, and also to prevent the electrode 83 and the aluminum alloy plate 81 from sticking to each other, for thereby allowing high-quality nuggets to be formed.

Figure 51:
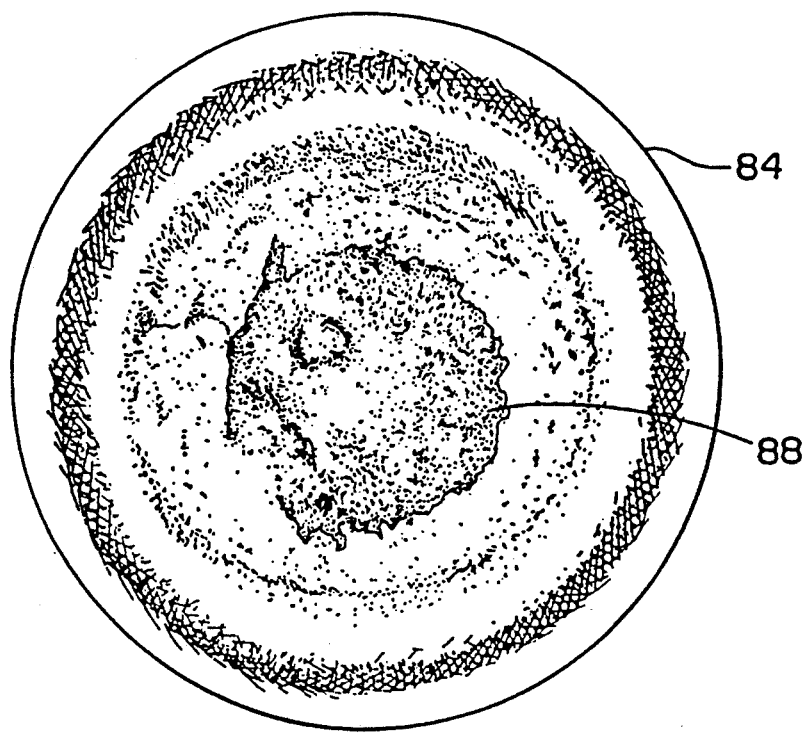
Figure 52:
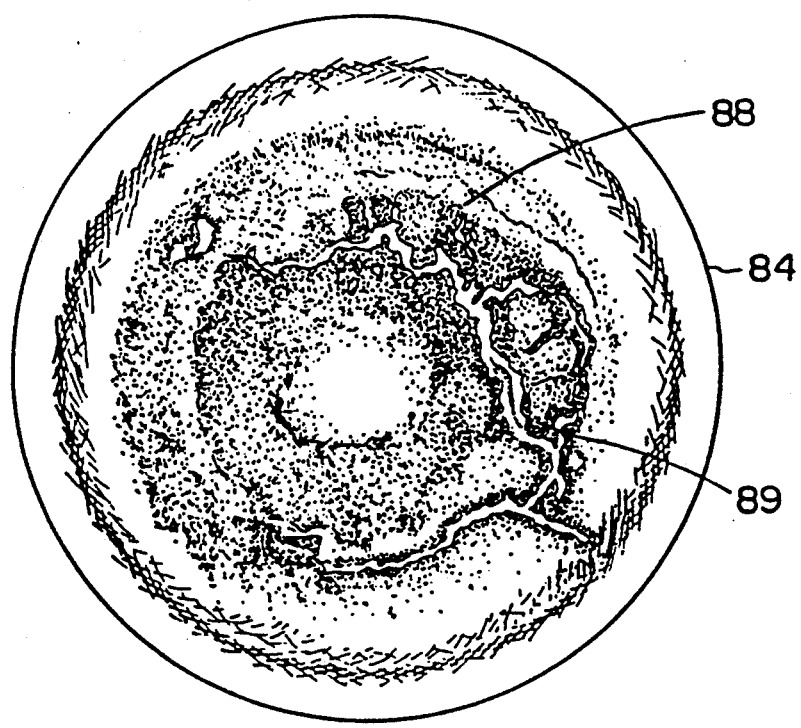

As shown in FIGS. 49 through 52, the tip end of the electrode 84 is progressively degraded by fused deposits 88 as the successive welding count increases. However, while the electrode 84 suffers cracks 89 as shown in FIG. 52 after the successive welding count is 800, the electrode 84 produces no cracks as shown in FIG. 51 after the successive welding count is 500. Therefore, at least until after the successive welding count is 500, any welding mark imprinted on the aluminum alloy plate 82 by the electrode 84 is highly smooth, and the electrode 84 can be used without damaging the aluminum alloy plate 82.

Positive and negative electrodes, each having a tip end in the shape of a partly spherical convex surface as with the electrode 84 shown in FIG. 42, were used in a welding test under the same conditions as described above with reference to FIG. 42. The results of the welding test are given in Table 2 below, and referred to as Comparative Example 2 in Table 2. Table 2 shows the "successive welding count" and the "effective successive welding count" with respect to Comparative Example 2.

Figure 53:
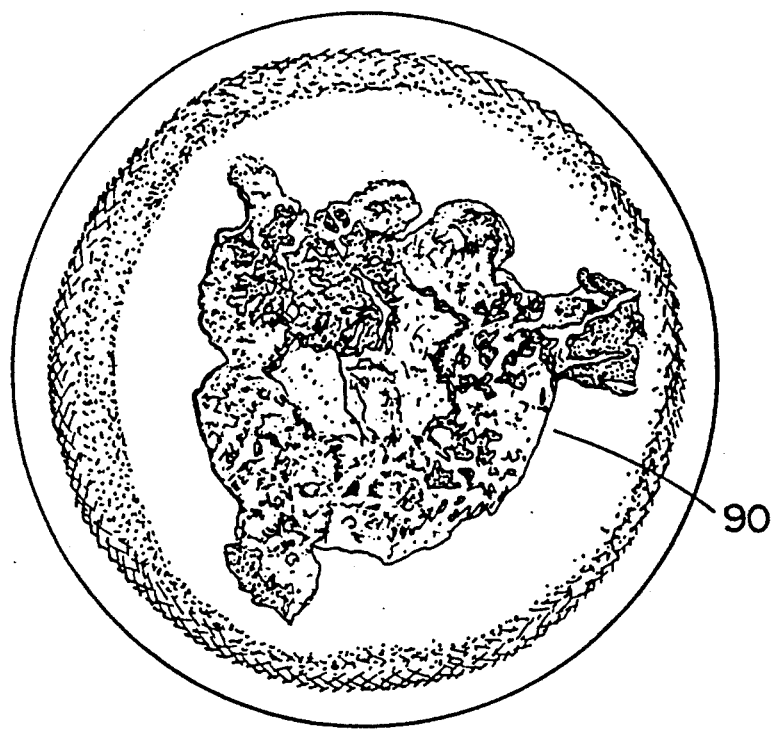
FIGS. 53 and 54 are plan views illustrative of the manner in which the tip ends of positive and negative electrodes used in a conventional resistance welding method 42 vary during usage.
Figure 54:
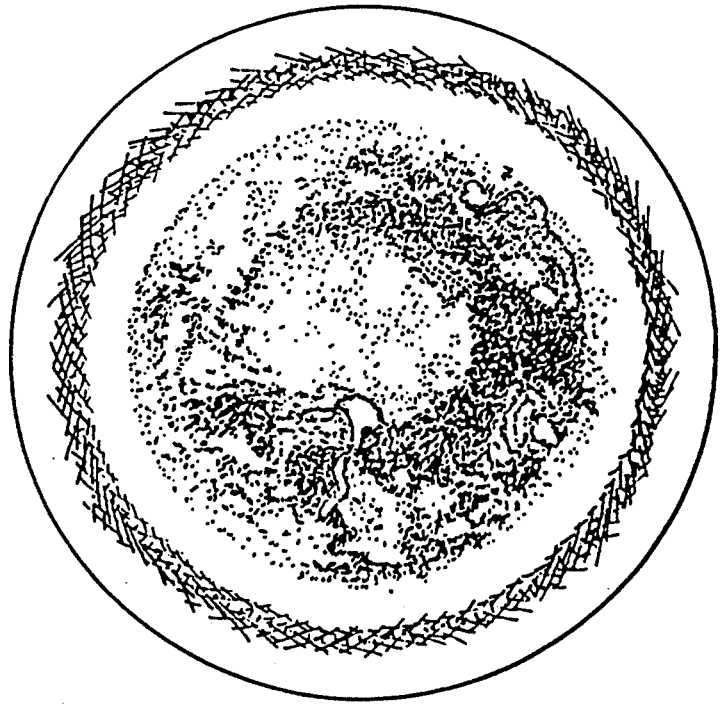

After the successive welding count is 100, the tip ends of the positive and negative electrodes according to Comparative Example 2 were observed at a magnification ratio of 7.5 as shown in FIGS. 53 and 54, respectively. The negative electrode does not suffer substantial damage as shown in FIG. 54, but the positive electrode exhibits a sign 90 indicative of sticking thereto of the aluminum alloy plate, as shown in FIG. 53.

Positive and negative electrodes which were identical in shape to the electrodes 83, 84, respectively, shown in FIG. 43, but were each formed from a commercially available electrode blank of chromium-copper alloy were manufactured in the same manner as shown in FIGS. 17 through 20. These positive and negative electrodes were used in a welding test in which, as shown in FIG. 42, aluminum alloy plates 81, 82 having respective thicknesses of 3.0 mm and 3.5 mm according to JIS-A5182 were superposed, and the electrodes were vertically pressed against the superposed aluminum alloy plates 81, 82 disposed therebetween under a pressure of 1600 kgf. In the welding test, a DC welding current of 46 kA was supplied in a welding time of 15 cycles. The results of the welding test are given in Table 2 below, and referred to as Inventive Example 4 in Table 2. Table 2 shows the "successive welding count" and the "effective successive welding count" with respect to Inventive Example 4.

Positive and negative electrodes, each identical to the negative electrode in Inventive Example 4 above, were used in a welding test under the same conditions as with Inventive Example 4. The results of the welding test are given in Table 2 below, and referred to as Comparative Example 3 in Table 2. Table 2 shows the "successive welding count" and the "effective successive welding count" with respect to Comparative Example 3.

TABLE 2

| | Pressure (kgf) | Current (kA) | Welding time (cycles) | A | B |
| --- | --- | --- | --- | --- | --- |
| Inventive Example 3 | 1200 | 42 | 15 | 900 | 800 |
| Comparative Example 2 | 1200 | 42 | 15 | 210 | 100 |
| Inventive Example 4 | 1600 | 46 | 15 | 480 | 420 |
| Comparative Example 3 | 1600 | 46 | 15 | 100 | 40 |

A: Successive welding count
B: Effective successive welding count

Comparison of Inventive Example 3 and Comparative Example 2 shows that when the electrodes 83, 84 are used respectively as positive and negative electrodes according to Inventive Example 3, the successive welding count and the effective successive welding count are much better, and the electrode service life is much longer, than when the positive and negative electrodes, each having a tip end in the shape of a partly spherical convex surface, are used according to Comparative Example 2. Furthermore, comparison of Inventive Example 4 and Comparative Example 3 shows that when the positive and negative electrodes identical in shape to the electrodes 83, 84, respectively, but each formed from a commercially available electrode blank of chromium-copper alloy are used according to Inventive Example 4, the successive welding count and the effective successive welding count are much better, and the electrode service life is much longer, than when the positive and negative electrodes are used according to Comparative Example 3. In addition, the electrodes according to Inventive Example 4 have a longer service life than the electrodes according to Comparative Example 2.

According to the resistance welding method, when an electrode with teeth on its tip end and an electrode with a partly spherical convex surface on its tip end are used as positive and negative electrodes, respectively, the positive electrode on which a thermal load concentrates and a workpiece are prevented from being fused together, and the attachment of fused materials to the electrodes and the damage of the electrodes are reduced. Consequently, the service life of the electrodes is much longer than electrodes used in the conventional resistance welding.

Since the tip end of the negative electrode is shaped into a partly spherical convex surface, any welding mark imprinted on the workpiece by the negative electrode is smooth and free of surface irregularities. As a consequence, the welded workpiece has a highly sightly appearance.

FIGS. 55 through 60 show an automobile body welded by the resistance welding method according to the present invention.

various components of an automobile body are welded using the electrodes 83, 84 shown in FIG. 42, for example, as positive and negative electrodes, respectively. In the welding process, the positive electrode 84 with the teeth 85 on its tip end is positioned inside the automobile body, and the negative electrode 84 with the partly spherical convex surface on its tip end is positioned outside the automobile body.

Figure 55:
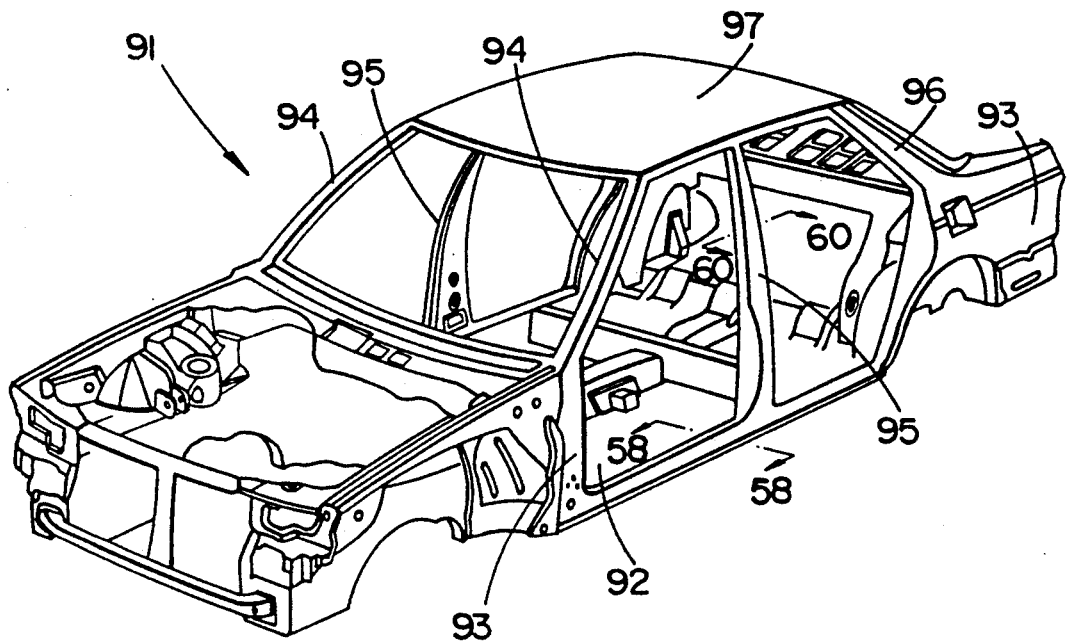
FIGS. 55 and 56 are perspective views of an automobile body welded by the resistance welding method according to the present invention.
Figure 56:
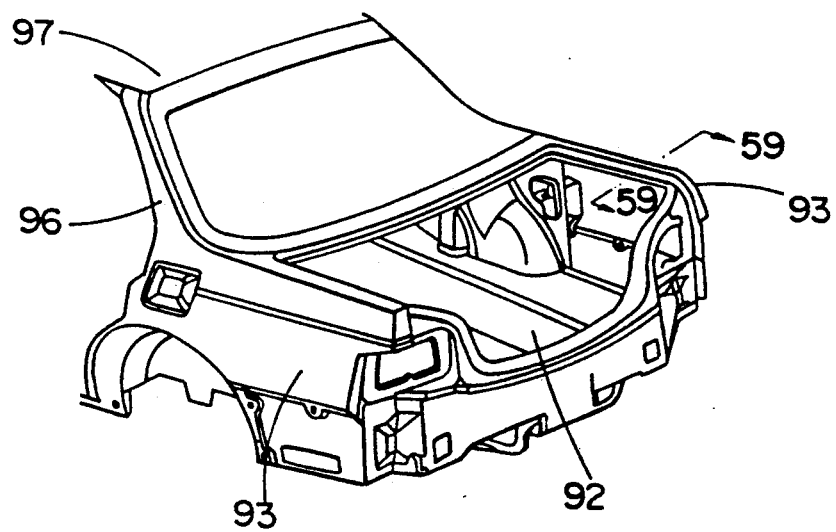

As shown in FIGS. 55 and 56, an automobile body 91 comprises a pair of side panels 93 attached to opposite sides of a floor panel 92 and connected to a roof 97 by front pillars (A pillars) 94, center pillars (B pillars) 95, and rear pillars (C pillars) 96. The floor panel 92, the side panels 93, and the center pillars 95 are made of aluminum alloy.

Floor panel members of the floor panel 92, the floor panel 92 and the side panels 93, side panel members of the side panels 93, and center pillar members of the center pillars 95 are welded according to the DC resistance welding process. The welding of these automobile body members will be described in detail below.

Figure 57:
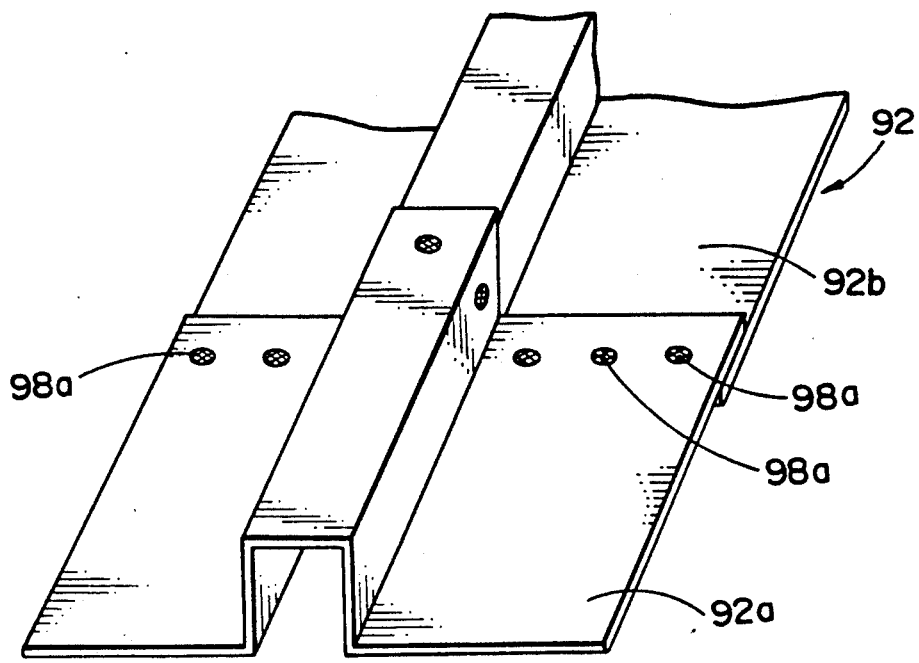
FIG. 57 is a fragmentary perspective view showing welding spots on floor members of the automobile body shown in FIGS. 55 and 56.

As shown in FIG. 57, the floor panel 92 has floor panel members 92a, 92b which overlap each other such that the floor panel member 92a is disposed inside the automobile body and the floor panel member 92b outside the automobile body. The overlapping portions of the floor panel members 92a, 92b are welded with welding marks 98a on the floor panel member 92a. In welding the floor panel members 92a, 92b, the positive electrode 83 is placed against the floor panel member 92a, and the negative electrode 84 is placed against the floor panel member 92b.

Figure 58:
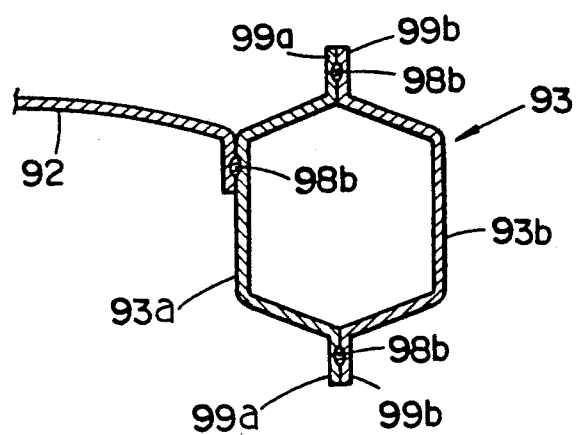
FIG. 58 is a cross-sectional view taken along line 58—58 of FIG. 55.

As shown in FIG. 58, a marginal side edge of the floor panel 92 is superposed on and welded to a inner side panel member 93a of the side panel 93. Thereafter, side flanges 99a of the inner side panel member 93a and side flanges 99b of an outer side panel member 93b of the side panel 93 are superposed on and welded to each other, with nuggets 98b formed between the welded side flanges 99a, 99b. In welding the floor panel 92 and the inner side panel member 93a, the electrode 83 is placed against the inner side panel member 93a and the electrode 84 is placed against the floor panel 92. In welding the inner side panel member 93a and the outer side panel member 93b, the electrode 83 is placed against the side flanges 99a of the inner side panel member 93a and the electrode 84 is placed against the side flanges 99b of the outer side panel member 93b.

Figure 59:
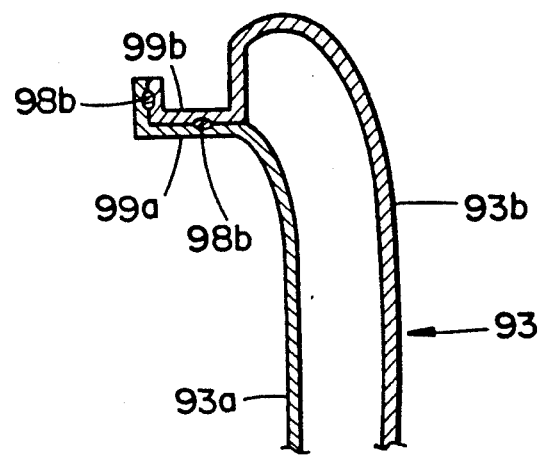
FIG. 59 is a cross-sectional view taken along line 59—59 of FIG. 56.

As shown in FIG. 59, other side flanges 99a, 99b of the inner and outer side panel members 93a, 93b are superposed on and welded to each other, with nuggets 98b formed between the welded side flanges 99a, 99b. In welding the inner and outer side panel member 93a, 93b, the electrode 83 is placed against the side flange 99a of the inner side panel member 93a and the electrode 84 is placed against the side flange 99b of the outer side panel member 93b.

Figure 60:
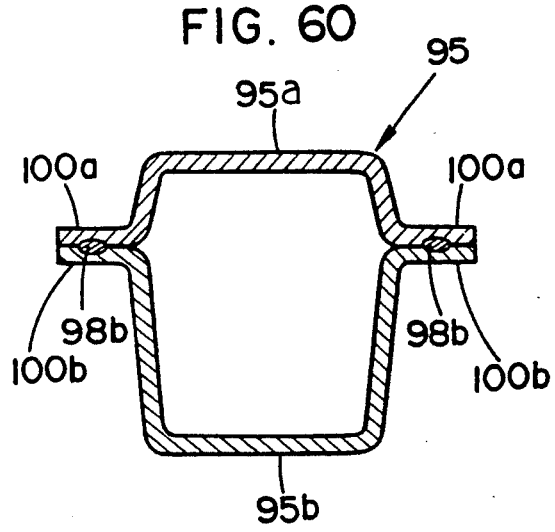
FIG. 60 is a cross-sectional view taken along line 60—60 of FIG. 55.

As shown in FIG. 60, side flanges 100a, 100b of inner and outer center pillar members 95a, 95b are superposed on and welded to each other, with nuggets 98b formed between the welded side flanges 100a, 100b. In welding the inner and outer center pillar member 95a, 95b, the electrode 83 is placed against the side flange 100a of the inner center pillar member 95a and the electrode 84 is placed against the side flange 100b of the outer center pillar member 95b.

After the components of the automobile body 91 are welded, welding marks imprinted by the pattern of the teeth 85 of the electrode 83 appear on the inner surfaces of the welded components, and smooth welding marks free of surface irregularities imprinted by the partly spherical convex surface of the electrode 84 appear on the outer surfaces of the welded components. Therefore, the outer surfaces of the welded components of the automobile body 91 are sightly in appearance. The welding marks 98a shown in FIG. 57 are imprinted by the pattern of the teeth 85 of the electrode 83.

The outer surfaces of the automobile body are subjected to adverse environmental conditions such as moisture in the air, ultraviolet radiation, acid rain, salty atmosphere, flying pebbles, and the coating on the automobile body tends to be peel off due to such adverse environmental conditions. The smooth welding marks free of surface irregularities on the outer surfaces of the automobile body are effectively protected against damage which would otherwise result from adverse environmental conditions.

Other automobile panels such as doors, engine hoods, and trunk lids may also be welded by the electrodes according to the present invention for advantages described above.

While the DC resistance welding process has been described in the above embodiment, insofar as the electrode 83 is positioned inside the automobile body 91 and the electrode 84 outside of the automobile body 91, an AC resistance welding process may be carried out to weld the components of the automobile body 91 with smooth welding marks on the outer surfaces thereof for a sightly appearance and also for protection against adverse environmental conditions.

Although certain preferred embodiments of the present invention have been shown and described in detail, it should be understood that various changes and modifications may be made therein without departing from the scope of the appended claims.

What is claimed is:

1. An electrode for use in resistance-welding workpieces of metal by being pressed against superposed regions of the workpieces and supplying an electric current to the superposed regions to heat the superposed regions due to an electric resistance of the workpieces, said electrode comprising:
   a body having a tip end for pressed engagement with one of the workpieces; and
   a matrix of tapered teeth disposed on said tip end of said body except for a center of said tip end with recesses defined between said tapered teeth, one of said recesses being positioned at the center of said tip end, each of said teeth having respective heights defined from a base of the teeth to respective tips of the teeth, said heights of said teeth becoming progressively higher from an outer circumferential edge of said tip end toward said center thereof.

2. An electrode according to claim 1, wherein the respective tips of said teeth are disposed along a spherical convex surface having a center of curvature positioned on a longitudinal axis of said body.

3. An electrode according to claim 2, wherein said recesses have respective bottoms joined by a flat plane lying perpendicularly to said longitudinal axis of said body.

4. An electrode according to claim 3, wherein each of said teeth is substantially in the shape of a pyramid, and wherein said base of each of said teeth has a length L, and a ratio of said length L to a thickness t of a workpiece being in a range of from 0.5 to 0.75.

5. An electrode according to claim 3, wherein a tallest one of said teeth has a height H, the ratio (H/t) of said height H to a thickness t of a workpiece being in a range of from 0.1 to 0.4.

6. An electrode according to claim 3, wherein said spherical convex surface has a radius R of curvature in a range of:

$$25t + 30 \text{ (mm)} \sim 50t + 50 \text{ (mm)}$$

where t is a predetermined thickness of a workpiece.

7. An electrode according to claim 2, wherein said teeth are progressively more sharply pointed toward the center of said tip end.

8. An electrode according to claim 1, wherein said teeth are arranged in a grid or diagonal pattern.

9. An electrode according to claim 1, wherein said teeth are arranged in a pattern indicative of an alphanumeric or an iconic symbol.

10. An electrode according to claim 1, wherein said teeth are arranged such that the recesses defined therebetween are arranged in a pattern indicative of an alphanumeric or an iconic symbol.

11. An electrode according to claim 1, wherein each of the recesses defined between said teeth has a concave bottom surface.

* * * * *